(12) United States Patent
Jeng et al.

(10) Patent No.: US 9,959,753 B2
(45) Date of Patent: May 1, 2018

(54) COMMUNICATION DEVICE, COMMUNICATION SYSTEM AND ASSOCIATED COMMUNICATION METHOD

(71) Applicant: INDUSTRIAL TECHNOLOGY RESEARCH INSTITUTE, Hsinchu (TW)

(72) Inventors: An-Kai Jeng, Hsinchu (TW); Yung-Cheng Chao, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 93 days.

(21) Appl. No.: 14/944,645

(22) Filed: Nov. 18, 2015

(65) Prior Publication Data
US 2017/0061789 A1    Mar. 2, 2017

(30) Foreign Application Priority Data

Aug. 26, 2015 (TW) ............................. 104127882 A

(51) Int. Cl.
*G08G 1/09* (2006.01)
*B60W 40/10* (2012.01)
(Continued)

(52) U.S. Cl.
CPC ............. *G08G 1/091* (2013.01); *B60W 40/10* (2013.01); *G08G 1/096716* (2013.01);
(Continued)

(58) Field of Classification Search
CPC . B60W 40/10; G08G 1/091; G08G 1/096716; G08G 1/096741;
(Continued)

(56) References Cited

U.S. PATENT DOCUMENTS 5,539,398 A    7/1996 Hall et al.
5,751,245 A *  5/1998 Janky .................... G01S 5/0027
                                                                    340/993
(Continued)

FOREIGN PATENT DOCUMENTS

CN    101419065 A    4/2009
CN    101727757 A    6/2010
(Continued)

OTHER PUBLICATIONS

Sundar Subramanian et al., "Congestion Control for Vehicular Safety: Synchronous and Asynchronous MAC Algorithms", Proceeding VANET '12 Proceedings of the ninth ACM international workshop on Vehicular inter-networking, systems, and applications, pp. 63-72, 2012.
(Continued)

*Primary Examiner* — Naomi J Small
(74) *Attorney, Agent, or Firm* — Rabin & Berdo, P.C.

(57) ABSTRACT

A communication device, a communication and associated communication method are provided. The communication device is placed at a first moving device and the communication device includes a movement detection module, a transmitter, and a controller. The movement detecting module detects movement of the first moving device to obtain at least one first movement parameter at a first time point, and detects the movement of the first moving device to obtain at least one second movement parameter at a second time point latter than the first time point. The transmitter transmits the at least one first movement parameter. By estimating position of the first moving device at the second time point, the controller obtains an estimated internal movement parameter. The controller controls the transmitter to transmit the at least one second movement parameter selectively according
(Continued)

to the estimated internal movement parameter and the at least one second movement parameter.

19 Claims, 17 Drawing Sheets

(51) Int. Cl.
*G08G 1/0967* (2006.01)
*G08G 1/16* (2006.01)
*H04W 84/00* (2009.01)
*H04W 84/18* (2009.01)

(52) U.S. Cl.
CPC .. *G08G 1/096741* (2013.01); *G08G 1/096791* (2013.01); *G08G 1/162* (2013.01); *H04W 84/005* (2013.01); *H04W 84/18* (2013.01)

(58) Field of Classification Search
CPC ............ G08G 1/096791; G08G 1/162; H04W 84/005; H04W 84/18
USPC ........................................................ 340/905
See application file for complete search history.

(56) References Cited

U.S. PATENT DOCUMENTS

| | | | |
|---|---|---|---|
| 7,463,890 B2* | 12/2008 | Herz | H04L 45/00 370/229 |
| 8,224,370 B2 | 7/2012 | Miucic | |
| 8,233,389 B2 | 7/2012 | Yim et al. | |
| 8,265,624 B2 | 9/2012 | Guner et al. | |
| 8,280,583 B2 | 10/2012 | Stahlin et al. | |
| 8,295,257 B2* | 10/2012 | Chen | G08G 1/094 370/338 |
| 8,520,695 B1* | 8/2013 | Rubin | G08G 9/02 370/337 |
| 8,731,809 B2 | 5/2014 | Koshizen | |
| 8,819,418 B2* | 8/2014 | Ando | H04L 9/3268 713/156 |
| 8,948,044 B2 | 2/2015 | Bansal et al. | |
| 9,008,959 B2 | 4/2015 | Noh et al. | |
| 9,043,069 B1* | 5/2015 | Ferguson | B60W 30/00 701/23 |
| 9,043,072 B1* | 5/2015 | Tisdale | G05D 1/021 701/28 |
| 2002/0027511 A1* | 3/2002 | Horita | G08G 1/0962 340/988 |
| 2002/0135467 A1* | 9/2002 | Koike | G01S 5/0072 340/436 |
| 2007/0032245 A1* | 2/2007 | Alapuranen | G08G 1/161 455/456.1 |
| 2010/0049819 A1 | 2/2010 | Hamada et al. | |
| 2010/0161205 A1* | 6/2010 | Kim | G08G 1/096716 701/118 |
| 2010/0312432 A1 | 12/2010 | Hamada et al. | |
| 2011/0140968 A1 | 6/2011 | Bai et al. | |
| 2011/0298603 A1* | 12/2011 | King | G08G 1/042 340/436 |
| 2011/0301779 A1* | 12/2011 | Shida | G01S 5/0072 701/1 |
| 2012/0249343 A1 | 10/2012 | Thomas | |
| 2012/0296539 A1 | 11/2012 | Cooprider et al. | |
| 2013/0058536 A1* | 3/2013 | Levin | A61B 5/18 382/104 |
| 2013/0082874 A1* | 4/2013 | Zhang | G01S 5/0072 342/357.31 |
| 2013/0103295 A1 | 4/2013 | Koshizen et al. | |
| 2013/0190025 A1 | 7/2013 | Sakata | |
| 2013/0336120 A1 | 12/2013 | Bai | |
| 2013/0344842 A1 | 12/2013 | McDonald et al. | |
| 2014/0005906 A1* | 1/2014 | Pandita | B60W 30/17 701/96 |
| 2014/0286325 A1 | 9/2014 | Kang et al. | |
| 2015/0036487 A1 | 2/2015 | Sakata | |
| 2015/0117335 A1 | 4/2015 | Jeng et al. | |
| 2015/0127191 A1 | 5/2015 | Misra et al. | |
| 2015/0294571 A1* | 10/2015 | Shida | G08G 1/161 701/409 |

FOREIGN PATENT DOCUMENTS

| | | |
|---|---|---|
| TW | I474941 B | 3/2015 |
| WO | WO-2011/038881 A1 | 4/2011 |
| WO | WO-2011/047708 A1 | 4/2011 |
| WO | WO-2013-163218 A1 | 10/2013 |

OTHER PUBLICATIONS

John B. Kenney et al., "LIMERIC: A Linear Message Rate Control Algorithm for Vehicular DSRC Systems", VANET '11 Proceedings of the Eighth ACM international workshop on Vehicular internetworking, pp. 21-30, 2011.
Bilstrup, K. et al., "Evaluation of the IEEE 802.11p MAC method for Vehicle-to-Vehicle Communication", IEEE 68th Vehicular Technology Conference, 2008. VTC 2008-Fall, Sep. 21-24, 2008, pp. 1-5.
Qi Chen et al., "IEEE 1609.4 DSRC Multi-Channel Operations and Its Implications on Vehicle Safety Communications", 2009 IEEE Vehicular Networking Conference (VNC), Oct. 28-30, 2009, pp. 1-8.
ETSI, ETSI TS 102 687 V1.1.1 (Jul. 2011), "Intelligent Transport Systems (ITS); Decentralized Congestion Control Mechanisms for Intelligent Transport Systems operating in the 5 GHz range; Access layer part", pp. 1-45, Jul. 2011.
ETSI, ETSI TS 102 724 V1.1.1 (Oct. 2012), "Intelligent Transport Systems (ITS); Harmonized Channel Specifications for Intelligent Transport Systems operating in the 5 GHz frequency band", pp. 1-31, Oct. 2012.
Taiwanese Office Action dated Mar. 25, 2016.
Extended European Search Report dated Jan. 24, 2017.

* cited by examiner

COMMUNICATION DEVICE, COMMUNICATION SYSTEM AND ASSOCIATED COMMUNICATION METHOD

This application claims the benefit of Taiwan application Serial No. 104127882, filed Aug. 26, 2015, the disclosure of which is incorporated by reference herein in its entirety.

TECHNICAL FIELD

The disclosure relates to a communication device, a communication system, and associated communication method related to vehicular communication system.

BACKGROUND

In a vehicular communication system, moving vehicles and roadside infrastructures are used as communicating nodes, and the vehicles and roadside infrastructures use wireless communication techniques to form a mobile network. The vehicles in the vehicular communication system which are neighboring or within a communication range (for example, 100 meters to 300 meters) connect to each other and exchange information such as safety warnings and traffic information. By transmitting movement notification between vehicles, the driver of a rear vehicle can be informed about the traffic status of the road ahead and have sufficient time to take action. For example, the driver of the rear vehicle is aware that slow traffic such as an accident or traffic jam occurs ahead and s/he may avoid driving through that area.

For the sake of illustration, a front vehicle is defined as vehicle A, and a rear vehicle is defined as vehicle B. In addition, how does a communication device of vehicle A (that is, communication device A) transmit movement notification related to vehicle A to a communication device of vehicle B (that is, communication device B) is illustrated as an example. It is noteworthy that, in practical application, communication device B may receive movement notifications from communication device of a number of vehicles, not only from communication device A.

In order to inform traffic condition to communication device B in advance, common techniques dynamically adjust the transmission rate (or transmission frequency) of the movement notification. That is, communication device A generates and transmits the movement notification to other communication devices according to measured movement of vehicle A. For example, when vehicle A is located at places where its movement may dramatically change (for example, at an intersection or a curve route), or when driver of vehicle A emerges brake, movement (such as velocity) of vehicle A is significantly decreased. In such case, communication device A transmits the movement notifications related to vehicle A with a higher transmission rate. However, communication devices placed at vehicles around vehicle A also send movement notification to vehicle B more frequent.

In the vehicular communication system, application notifications are broadcast to inform status of vehicles and events. These application notifications may include road hazard signaling (hereinafter, RHS), intersection collision risk warning (hereinafter, ICRW), signal violation warning (hereinafter, SVW), transit signal priority (hereinafter, TSP), pre-crash warning (hereinafter, PCW) and so forth. However, when these application notifications are generated and transmitted together, serious channel congestion may happen and important application notifications (especially for security ones) cannot be received in a real time manner. Therefore, in common techniques, the transmission rate of movement notifications is lowered in response to quality of communication bandwidth. Consequently, communication device A generates and transmits less movement notifications to communication device B.

For example, in a general case, communication device A is assumed to generate and transmit the movement notifications related to vehicle A in a transmission rate of 10 Hz. When an emergency event happens, area surrounding vehicle A becomes congest, and communication device A transmits the movement notifications with higher transmission rate (for example, 20 Hz). However, communication device placed at vehicles which are neighboring vehicle A also transmit their corresponding movement notifications with higher rate. As a result, the communication bandwidth becomes congest. In order to sooth the congestion of communication bandwidth, communication device A may instead lower down the transmission rate of the movement notification from 10 Hz to 4 Hz.

In a case that the velocity of vehicle B is assumed to be 100 kilometer/hour (that is, 27.78 meter/second), a transmission interval of movement notification will extend from 100 millisecond to 250 millisecond if the transmission rate of communication device A is decreased from 10 Hz to 4 Hz. Consequentially, communication device B receives the movement notification related to vehicle A after a delay duration, and vehicle B continuously moves forward during the delay duration. That is to say, position of vehicle B becomes closer to vehicle A.

In Table 1, the distance that vehicle B moves during the delay duration when transmission rate is 10 Hz and 4 Hz are compared. The columns in Table 1 respectively represent when the transmission rate of movement notification is 10 Hz (that is, receiving cycle is 100 ms), 4 Hz (that is, receiving cycle is 250 ms), and the distance difference between the transmission rate of 10 Hz and the transmission rate of 4 Hz.

The rows in Table 1 are respectively illustrated in a top-down sequence. The first row represents that the first movement notification sent by communication device A is successfully received by communication device B. The second row represents that communication device B misses the first movement notification and successfully receives the second movement notification. The third row represents that communication device B misses the first and the second movement notifications but receives the third movement notification.

TABLE 1

| moving distance of vehicle B | transmission rate = 4 Hz transmission interval = 250 millisecond | transmission rate = 10 Hz transmission interval = 100 millisecond | distance difference (meter) |
| --- | --- | --- | --- |
| receiving first movement notification | 27.78 m/s * 0.25 s * 1 = 6.94 meters | 27.78 m/s * 0.1 s * 1 = 2.778 meters | 6.94 − 2.778 = 4.162 meters |
| receiving second movement notification | 27.78 m/s * 0.25 s * 2 = 13.88 meters | 27.78 m/s * 0.1 s * 2 = 5.556 meters | 13.88 − 5.556 = 8.324 meters |
| receiving third movement notification | 27.78 m/s * 0.25 2 s * 3 = 0.83 meters | 27.78 m/s * 0.1 s * 3 = 8.334 meters | 20.83 − 8.334 = 12.496 meters |

According to the first row in Table 1, if the transmission rate of movement notification is changed from 10 Hz to 4 Hz and communication device B successfully receives the first movement notification, vehicle B will move 4.162 meters more and become close to vehicle A. According to the second row in Table 1, if the transmission rate of movement notification is changed from 10 Hz to 4 Hz and communication device B receives the second movement notification, vehicle B will move 8.324 meters more and become closer to vehicle A. According to the third row in Table 1, if the transmission rate of movement notification is changed from 10 Hz to 4 Hz and communication device B receives the third movement notification, vehicle B will move 12.496 meters more and become much more close to vehicle A.

When movement of vehicle A varies rapidly, vehicle B needs to acquire status of surrounding environment of vehicle A more often. However, increasing transmission rate of movement notification may result in the side effects that channel load becomes heavy and the movements notifications are congest. Consequentially, vehicle B may move forward and become closer to vehicle A. According to Table 1, when the transmission rate of movement notification is decreased, vehicle B is notified later and negative impacts on the vehicle status system may be caused.

As described above, the actual receiving rate of the movement notification may be decreased if the channel becomes congest. The channel congestion can be caused by that vehicles increasingly transmits movement notifications due to the easily changed movement variation. When traffic congestion happens, movement status of vehicle may not be reflected in a real time manner and the effect of the vehicular communication system is affected.

SUMMARY

The disclosure is directed to a communication method, a communication system and a communication device applied to vehicular communication system.

According to an embodiment, a communication method applied between a first communication device and a second communication device is provided. The communication method includes following steps. A first moving device is equipped with the first communication device. The first communication device detects movement of the first moving device at a first time point to obtain at least one first movement parameter. The first communication device transmits the at least one first movement parameter and the at least one first movement parameter is received and stored by the second communication device. According to comparison between an estimated internal movement parameter and the at least one second movement parameter, the first communication device selectively transmits at least one second movement parameter to the second communication device. The first communication device detects the movement of the first moving device at a second time point to obtain the at least one second movement parameter. The second time point is latter than the first time point. The second communication device obtains the movement of the first moving device according to either the at least one second movement parameter or an estimated external movement parameter. Wherein the second communication device estimates position of the first moving device at the second time point based on at least one estimating function and the at least one first movement parameter and accordingly obtains the estimated external movement parameter.

According to another embodiment, a communication system is provided. The communication system includes a first communication device and a second communication device. The first communication device is placed at a first moving device. The first communication device configures to detect movement of the first moving device at a first time point to obtain at least one first movement parameter. The first communication device detects the movement of the first moving device at a second time point to obtain at least one second movement parameter. The first communication device transmits the at least one second movement parameter selectively according to comparison between an estimated internal movement parameter and the at least one second movement parameter. The second time point is latter than the first time point. The second communication device receives and stores the at least one first movement parameter. The second communication device obtains the movement of the first moving device at the second time point according to either the at least one second movement parameter or an estimated external movement parameter. By estimating position of the first moving device at the second time point based on at least one estimating function and the at least one first movement parameter, the second communication device accordingly obtains the estimated external movement parameter.

According to an alternative embodiment, a communication device placed at a first moving device is provided. The communication device includes a movement detecting module, a transmitter, and a controller. The movement detecting module configures to detect movement of the first moving device to obtain at least one first movement parameter at a first time point, and detect the movement of the first moving device to obtain at least one second movement parameter at a second time point latter than the first time point. The transmitter configures to transmit the at least one first movement parameter and selectively transmit the at least one second movement parameter. By estimating position of the first moving device at the second time point based on at least one first estimating function and the at least one first movement parameter, the controller accordingly obtains an estimated internal movement parameter. The controller configures to control the transmitter to transmit the at least one second movement parameter selectively according to comparison between the estimated internal movement parameter and the at least one second movement parameter.

BRIEF DESCRIPTION OF THE DRAWINGS

FIG. 3 is a schematic diagram illustrating that communication devices according to an exemplary embodiment of the present disclosure are placed at the moving device and transmit movement parameter in between.

Figure 1:
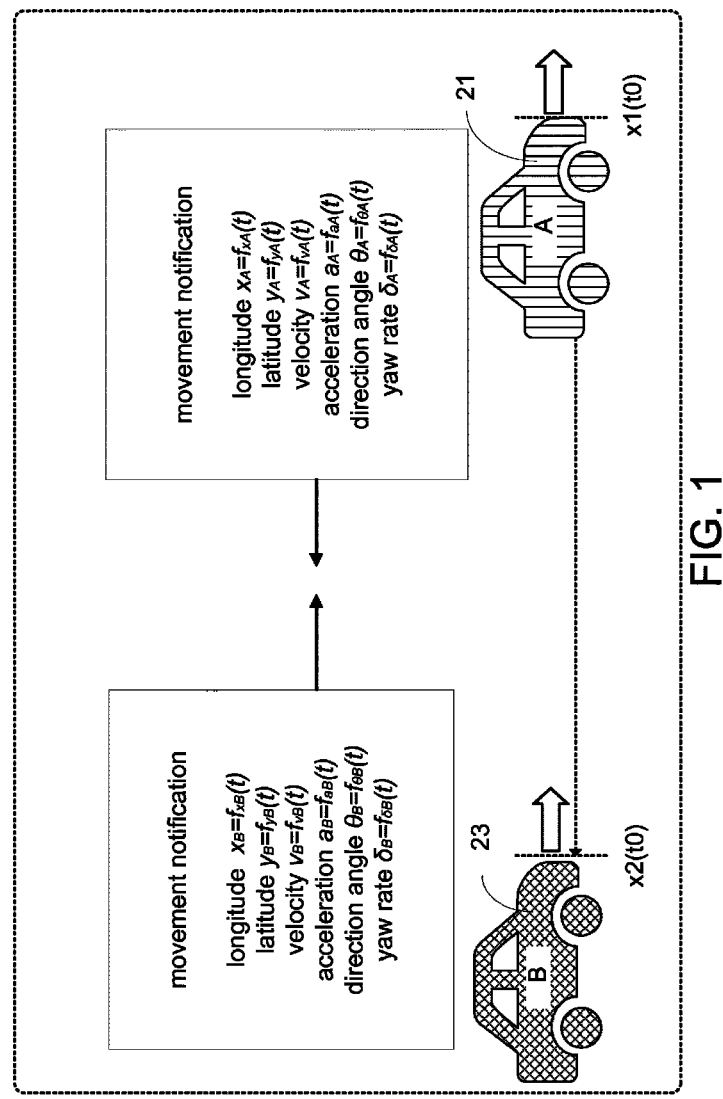
FIG. 1 is a schematic diagram illustrating an exemplary embodiment of the present disclosure that movement parameters are transmitted between vehicles.

In the following detailed description, for purposes of explanation, numerous specific details are set forth in order to provide a thorough understanding of the disclosed exemplary embodiments. However, that one or more embodiments in accordance with the present disclosure may be practiced without these specific details. In other instances, well-known structures and devices are schematically shown in order to simplify the drawing.

DETAILED DESCRIPTION

FIG. 1 is a schematic diagram illustrating an embodiment of the present disclosure that movement parameters are transmitted between vehicles. In FIG. 1, vehicle A (at position x1(t0), as a front vehicle) and vehicle B (at position x2(t0), as a rear vehicle) are assumed to move from left side to right side. Communication device A 21 transmits movement notification related to vehicle A to communication device B 23, and communication device B 23 is capable of estimating position of vehicle A in the near future. The movement notification can include at least one movement parameter. For example, the at least one movement parameter being sent from communication device A 21 to communication device B 23 can include a combination of one or more of a longitude parameter $x_A$, a latitude parameter $y_A$, a velocity parameter $v_A$, an acceleration parameter $a_A$, a direction angle parameter $\theta_A$, a yaw rate (angular velocity) parameter $\delta_A$ and so forth. Similarly, the at least one movement parameter being sent from communication device B 23 to communication device A 21 can include a combination of one or more of a longitude parameter $x_B$, a latitude parameter $y_B$, a velocity parameter $v_B$, an acceleration parameter $a_B$, a direction angle parameter $\theta_B$ and/or a yaw rate (angular acceleration) parameter $\delta_B$ and so forth.

For the sake of illustration, naming of the variable and parameter in the disclosure is entitled with "internal" and "external" so that origin of the variable and parameter can be distinguished. The variable and parameter originated from the communication device itself are entitled with the term of "internal". The variable and parameter originated from other communication devices are entitled with the term of "external". For example, a movement parameter generated by the communication device itself is defined as an internal movement parameter (MP_int), and a movement parameter received from other communication devices are the defined as an external movement parameter (MP_ext). In addition, number of the movement parameter utilized by the communication device is not limited. That is, number of the internal movement parameter (MP_int) and/or number of external movement parameter (MP_ext) may be one or more than one.

Therefore, communication device A generates its internal movement parameter which may include but not limited to a longitude parameter $x_A$, a latitude parameter $y_A$, a velocity parameter $v_A$, an acceleration parameter $a_A$, a direction angle parameter $\theta_A$, and a yaw rate parameter (angular acceleration) $\delta_A$. However, for communication device B, the longitude parameter $x_A$, the latitude parameter $y_A$, the velocity parameter $v_A$, the acceleration parameter $a_A$, the direction angle parameter $\theta_A$ and/or yaw rate parameter $\delta_A$ are considered as the external movement parameter(s). Furthermore, communication device B considers the movement parameter generated by communication device B itself, that is, a combination of one or more of a longitude parameter $x_B$, a latitude parameter $y_B$, a velocity parameter $v_B$, the acceleration parameter $a_B$, the direction angle parameter $\theta_B$, and the yaw rate parameter (angular acceleration parameter) $\delta_B$, as internal movement parameter(s). Similarly, the longitude parameter $x_B$, the latitude parameter $y_B$, the velocity parameter $v_B$, the acceleration parameter $a_B$, direction angle parameter $\theta_B$ and/or yaw rate parameter $\delta_B$ are considered as external movement parameter after being received by communication device A.

Figure 2:
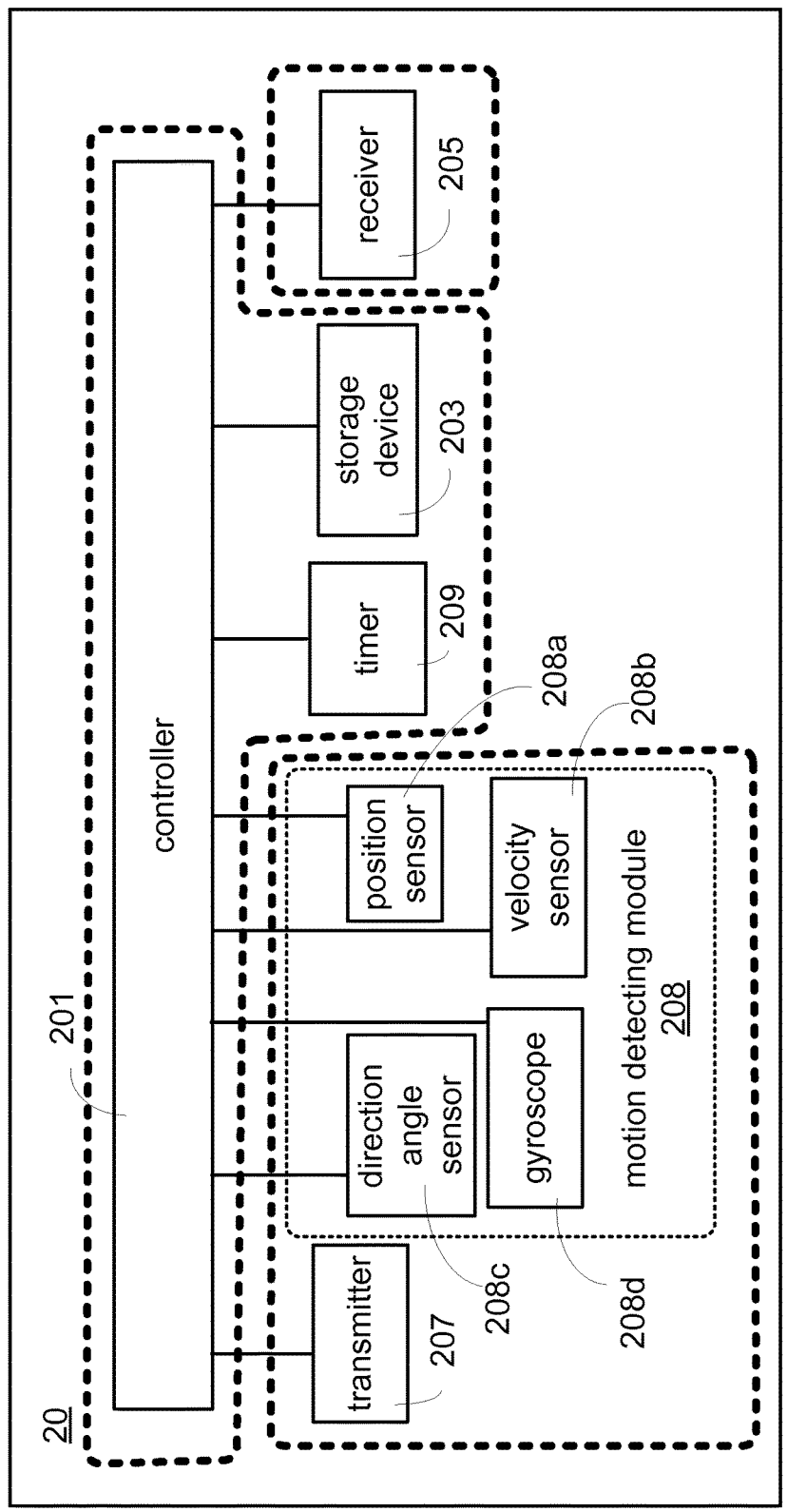
FIG. 2 is a schematic diagram illustrating blocks in the communication device according to an exemplary embodiment of the present disclosure.

FIG. 2 is a schematic diagram illustrating blocks in the communication device according to an embodiment of the present disclosure. The communication device 20 is placed at a moving device (for example, vehicle A, vehicle B etc.). The communication device 20 can include a controller 201, a storage device 203, a receiver 205, a transmitter 207, a movement detecting module 208 and a timer 209. The controller 201 is electrically connected to the rest components. The movement detecting module 208 can further be configured to include a position sensor 208a for generating a longitude parameter (x) and a latitude parameter (y), a velocity sensor 208b for generating a velocity parameter (v) and an acceleration parameter (a), a direction angle sensor 208c for generating direction angle parameter (θ), a gyroscope 208d for generating angular velocity parameter (yaw rate parameter) (δ) or a combination of plural detecting components. In practical application, types of detecting components being used by the movement detecting module 208 are not limited.

Depending on different purposes, components in the communication device 20 can be classified into three types. The first type of components are configured to generate and transmit the at least one internal movement parameter (MP_int). The first type of components can include, for example, the transmitter 207 and the movement detecting module 208. The second type of components are configured to receive the at least one external movement parameter (MP_ext). The second type of component can include the receiver 205. The third type of components are used in both occasions that the communication device transmits the at least one internal movement parameter (MP_int) and receives the at least one external movement parameter (MP_ext). The third type of component can include the storage device 203, the timer 209 and the controller 201.

Generation and transmission flow of the internal movement parameter (MP_int) are firstly illustrated. After the movement detecting module 208 generates the internal movement parameter (MP_int), the controller 201 determines whether the transmitter 207 should transmit the internal movement parameter (MP_int) to other communication devices. If the controller 201 determines that the internal movement parameter (MP_int) should be transmitted, the controller 201 stores a copy of the internal movement parameter (MP_int) in the storage device 203. If the controller 201 determines that the internal movement parameter (MP_int) should not be transmitted, the controller 201 only transmits the internal movement parameter (MP_int) to application programs at upper layer. Details about how the controller 201 configures to determine to transmit or not to transmit the internal movement parameter (MP_int) to other communication device will be illustrated within the following paragraphs.

Details about adoption of the received external movement parameter (MP_ext) are illustrated. After the receiver 205 receives the movement notification being sent from other communication devices (that is, inward movement notification (MSG_in)), the controller 201 parses and acquires content of the inward movement notification (MSG_in) and accordingly determines whether the movement notification (MSG_in) includes the external movement parameter (MP_ext). If the inward movement notification (MSG_in) actually includes the external movement parameter (MP_ext), the controller 201 stores the external movement parameter (MP_ext) to the storage device 203. If the inward movement notification (MSG_in) does not include the external movement parameter (MP_ext), the controller 201 selectively acquires the previously stored external movement parameter (MP_ext) and estimates the external movement parameter depending on different condition. Details about how the external movement parameter (MP_ext) is utilized by the controller 201 will be illustrated within the following paragraphs.

Figure 3:
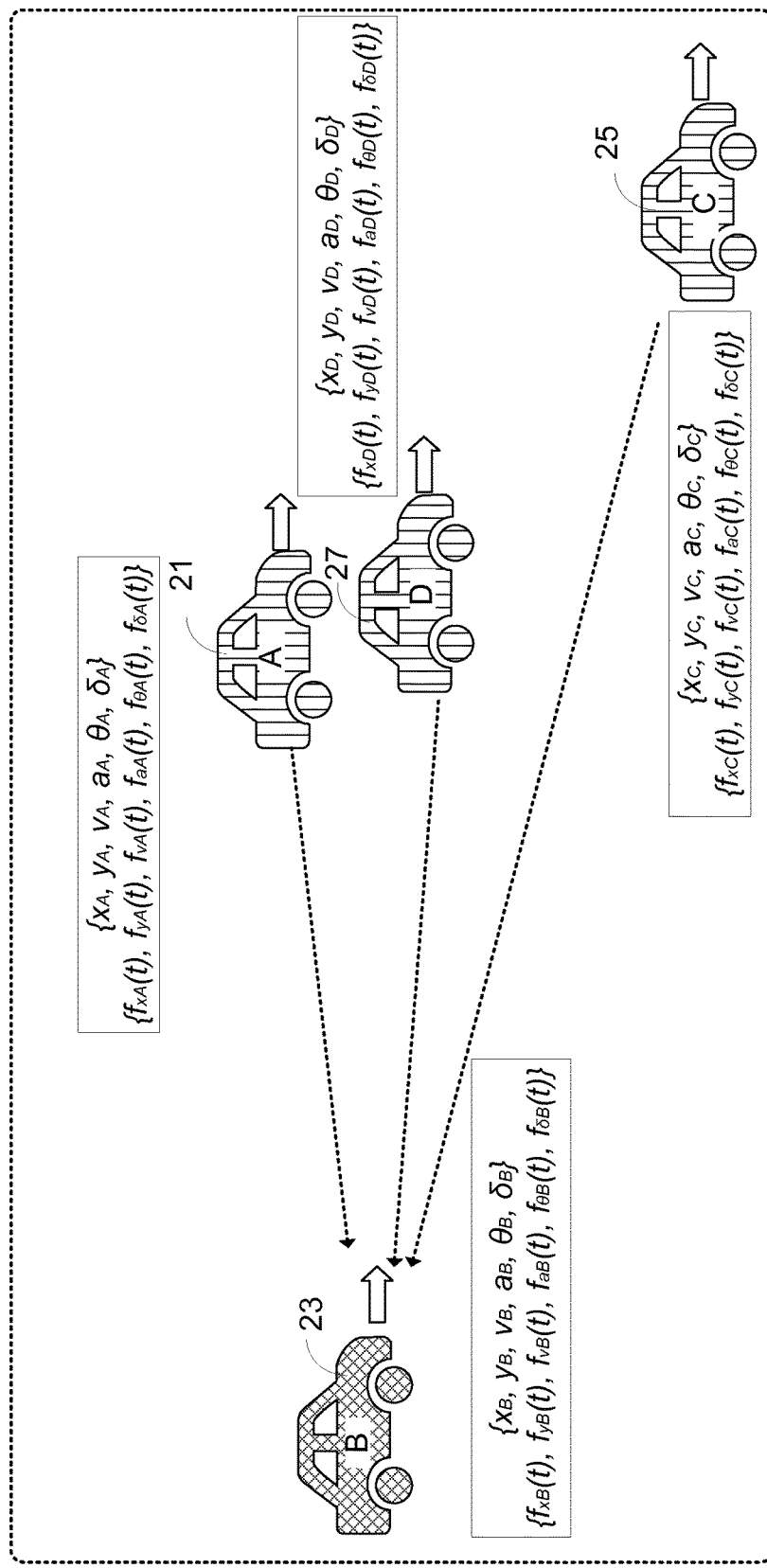

FIG. 3 is a schematic diagram illustrating that communication devices according to an embodiment of the present disclosure are placed at the moving device and transmit movement parameter in between. In FIG. 3, it is assumed that vehicle B is behind vehicle A, vehicle C 25 and vehicle D 27. According to an embodiment of the present disclosure, each of vehicle A, vehicle B, vehicle C and vehicle D 27 is equipped with a communication device for generating movement parameter (MP) corresponding to these vehicles. Besides, communication device A 21, communication device B 23, communication device C 25 and communication device D 27 are capable of respectively selecting an appropriate and corresponding estimating function set (EstFunc) based on the movement parameter (MP) generated by themselves. The estimating function set (EstFunc) is selected by the communication device according to position of the moving device being equipped with the communication device.

The operations of communication device B 23 is illustrated as an example, the storage device of communication device B configures to store movement parameters of vehicle B $\{x_B, y_B, v_B, a_B, \theta_B, \delta_B\}$ and estimating function set of vehicle B $\{f_{xB}(t), f_{yB}(t), f_{vB}(t), f_{aB}(t), f_{\theta B}(t), f_{\delta B}(t)\}$. In addition, communication device B 23 receives and stores the movement parameter of vehicle A $\{x_A, y_A, v_A, a_A, \theta_A, \delta_A\}$, the estimating function set of vehicle A $\{fx_A(t), fy_A(t), fv_A(t), fa_A(t), f_{\theta A}(t), f_{\delta A}(t)\}$, the movement parameter of vehicle C 25 $\{x_C, y_C, vC, a_C, \theta_C, \delta_C\}$, the estimating function set of vehicle C 25 $\{f_{xC}(t), f_{yC}(t), f_{vC}(t), f_{aC}(t), f_{\theta C}(t), f_{\delta C}(t)\}$, the movement parameter of vehicle D 27 $\{x_D, y_D, v_D, a_D, \theta_D, \delta_D\}$, and the estimating function set of vehicle D 27 $\{f_{xD}(t), f_{yD}(t), f_{vD}(t), f_{aD}(t), f_{\theta D}(t), f_{\delta D}(t)\}$. The estimating function set selected by the communication device itself is defined as the internal estimating function set (EstFunc_int), and the estimating function sets selected by the other communication devices are defined as the external estimating function set (EstFunc_ext). Therefore, communication device B considers the movement parameter $\{X_B, y_B, v_B, a_B, \theta_B, \delta_B\}$ as its internal movement parameter, and the estimating function set $\{f_{xB}(t), f_{yB}(t), f_{vB}(t), f_{aB}(t), f_{\theta B}(t), f_{\delta B}(t)\}$ as its internal estimating function set. On the other hand, communication device B considers the movement parameter and estimating function set corresponding to vehicle A, vehicle C, and vehicle D as the external movement parameters and the external estimating function sets, respectively. The estimating function set may include at least one estimating function and number of the estimating function being included in the estimating function set is not limited. Number and types of the estimating function can be varied in correspondence with type of the movement parameter being detected. For example, if only the velocity parameter (v) is transmitted between the communication devices, the estimating function set may include estimating function related with the velocity parameter (v).

Figure 4:
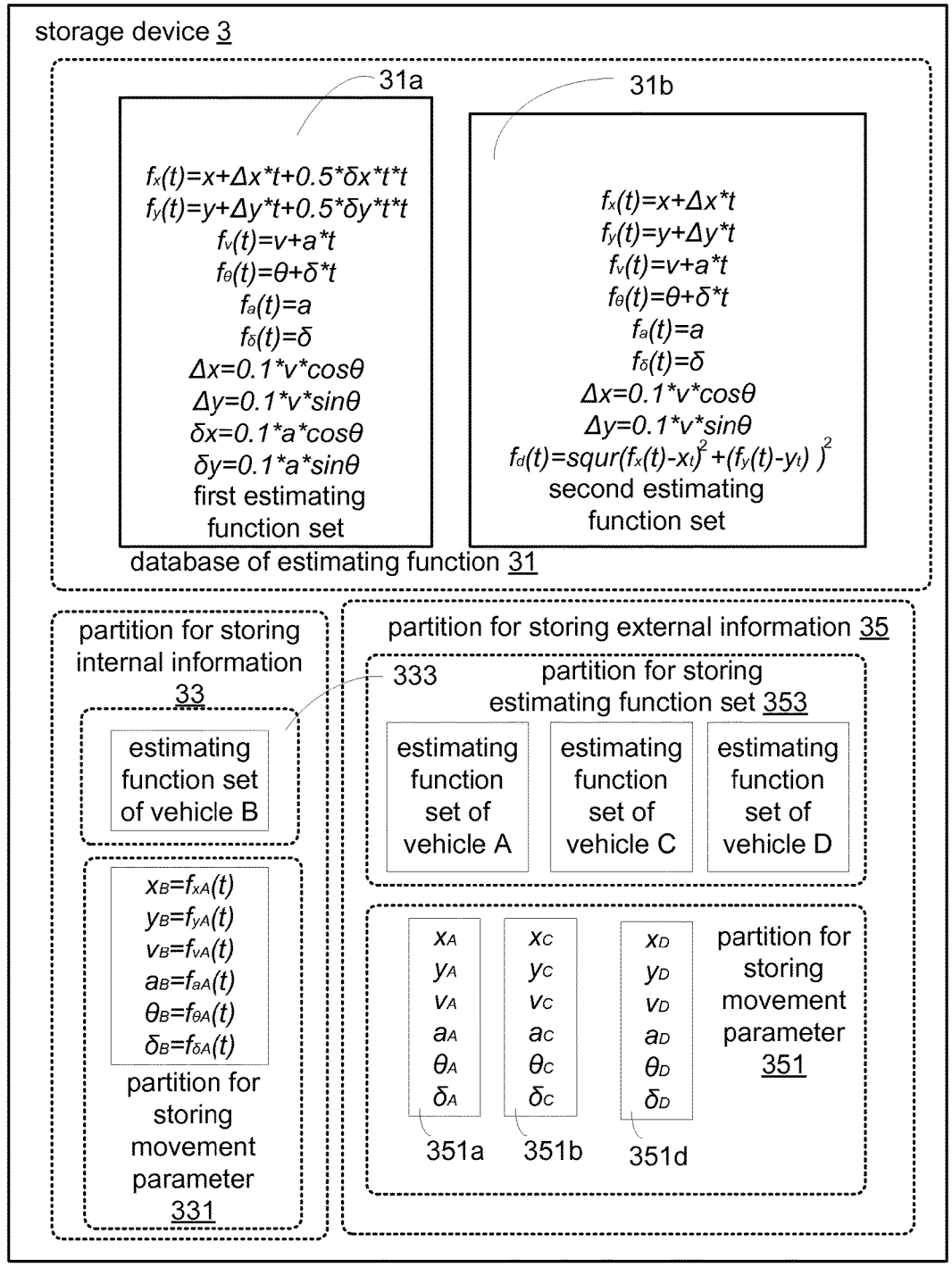
FIG. 4 is a schematic diagram illustrating an exemplary embodiment of partitions of the storage device.

FIG. 4 is a schematic diagram illustrating an embodiment of partitions of the storage device. The storage device 3 can be configured to include a database of estimating function set 31, a partition for storing internal information 33, and a partition for storing of external information 35. The database of estimating function set 31 can store multiple estimating function sets. The database of estimating function set 31 allows the communication device to select an appropriate estimating function set suitable for position and movement of the moving device equipped with the communication device itself. Alternatively, the database of estimating function set 31 can be used together with setting selections received from other communication device(s). For example, if communication device A selects to utilize the first estimating function set 31a, communication device A transmits the setting selection "1" to communication device B.

According to the embodiment shown in FIG. 4, the database of estimating function 31 is assumed to provide two estimating function sets. The first estimating function set 31a can include at least one estimating function. For example:
estimating function of longitude: $f_x(t)=x+\Delta x*t+0.5*\delta x*t*t$;
estimating function of latitude: $f_y(t)=y+\Delta y*t+0.5*\delta y*t*t$;
estimating function of velocity: $f_v(t)=v+a*t$; $f\theta(t)=\theta+\delta*t$;
estimating function of acceleration: $f_a(t)=a$;
estimating function of angular acceleration: $f_\delta(t)=\delta$;
estimating function of longitude movement: $\Delta x=0.1*v*\cos\theta$;
estimating function of latitude movement: $\Delta y=0.1*v*\sin\theta$;
estimating function of longitude included angle: $\delta x=0.1*a*\cos\theta$; and/or
estimating function of latitude included angle: $\delta y=0.1*a*\sin\theta$.

Besides, the second estimating function set 31b can include at least one estimating function, for example:
estimating function of longitude: $f_x(t)=x+\Delta x*t$;
estimating function of latitude: $f_y(t)=y+\Delta y*t$;
estimating function of velocity: $f_v(t)=v+a*t$; $f\theta(t)=\theta+\delta*t$;
estimating function of acceleration: $f_a(t)=a$;
estimating function of angular acceleration: $f_\delta(t)=\delta$;
estimating function of longitude movement: $\Delta x=0.1*v*\cos\theta$;

estimating function of latitude movement: Δy=0.1*v*sin θ; and/or
estimating function of position: fd(t)=squr(fx(t)−xt2)+(fy(t)−yt2).

The estimating function included in the estimating function set is used to estimate a movement parameter which is generated later, for example, at time point (tn), according to a time parameter and the movement parameter which is generated earlier, for example, at time point (t0). The time parameter can be defined as a time difference between a second time point (for example, time point (tn)) and a first time point (for example, time point (t0)). According to the embodiment of the present disclosure, the estimating function set can be pre-stored in the communication device when the communication device is manufactured. Or, the estimating function set can be set by the user according to his/her preferences. Setting selection of the estimating function set may change in response of different road conditions such as in a countryside, in a city, at high way or in a mountain road. In practical application, the number and calculation of the estimating function set provided by the communication device are not limited. For example, the communication device may provide only one estimating function set. Alternatively, the communication device can notify other communication device about which estimating function set has been selected via the outward movement notification (MSG_out).

The partition for storing internal information 33 is used for storing the internal movement parameter (MP_int) related to the vehicle where the communication device is located. The partition for storing external information 35 is used for storing the external movement parameter (MP_ext) received from communication devices which are placed at other moving devices. Besides, both the partition for storing internal information 33 and the partition for external information 35 can be further divided into two partitions, one for storing the estimating function set and the other one for storing the movement parameter. The partitions for storing estimating function set 333, 353 can store the internal/external estimating function set, and the partitions for storing movement parameter 331, 351 can store the internal/external movement parameter. The partitions for storing estimating function set 333, 353 may provide a combination of one or more of the estimating functions mentioned above, and the partitions for storing movement parameter 331, 351 may include a combination of one or more of the movement parameters related to movement of vehicles. Furthermore, types of estimating function provided by the estimating function set, and types of movement parameters are not limited.

The storage device of communication device B 23 shown in FIG. 3 is illustrated as an example. The partition for storing internal information of storage device in communication device B 23 stores the internal movement parameter and internal estimating function set which are corresponding to vehicle B. The external movement parameters and the external estimating function set which are corresponding to vehicle A, vehicle C, vehicle D are stored at the partition for storing external information of storage device in communication device B.

In the embodiment shown in FIG. 4, it is assumed that "0" is used to represent a first estimating function set, and "1" is used to represent a second estimating function set. Because position of vehicle A and position of vehicle D are relatively close in FIG. 3, communication device A 21 and communication device D 27 may select to use an identical estimating function set. For example, the estimating function set selected by communication device A and communication device D are both assumed to be "1", and the estimating function set selected by communication device C is assumed to be "0". That is, in the partition for storing estimating function set 353, "1" is stored as the setting value corresponding to the estimating function set of communication device A and communication device D, and "0" is stored as the setting value corresponding to the estimating function set of communication device C. Therefore, the controller of communication device B can acquire content of the block for storing estimating function set 353 to know which estimating function sets are selected by communication devices A, C and D.

Figure 5:
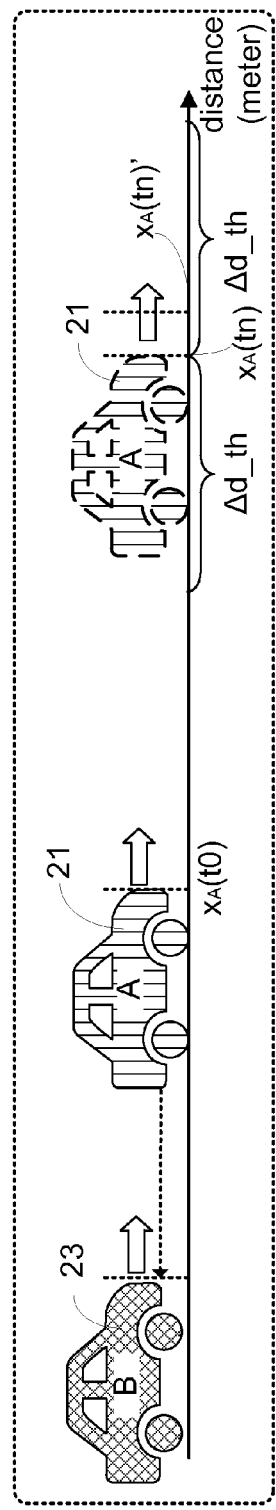
FIG. 5 is a schematic diagram illustrating an example of a difference between an actual position and an estimated position of vehicle A.

FIG. 5 is a schematic diagram illustrating an example of a difference between an actual position and an estimated position of vehicle A. It is assumed that the detected position of vehicle A at time point (t0) is $x_A(t0)$. When communication device B 23 receives position of vehicle A at time point (t0), $x_A(t0)$, communication device B 23 estimates external position parameter of vehicle A at time point (tn), which is represented as $x_A(tn)$, based on the external estimating function set corresponding to vehicle A and the detected position of vehicle A at time point $x_A(t0)$. For example, assuming that the estimating function set and the position parameter of vehicle at time point (t0), $x_A(t0)$, are still effective at time point (tn), communication device B 23 then estimates position parameter of vehicle A at time point (tn) by estimating position parameter of vehicle A at time point (tn). The estimated position parameter of vehicle A at time point (tn) is represented as $x_A(tn)$. The time point (t0) can be considered as a first time point, and the time point (tn) can be considered as a second time point. The second time point (tn) is latter than the first time point (t0).

The actual position of vehicle A at time point $x_A(tn)$ is detected by communication device A 21, and communication device A can determine the accuracy of the estimated position parameter $x_A(tn)$. Thus, communication device A 21 simultaneously proceeds the estimation procedure similar to the ones executed by communication device B. That is, communication device A simultaneously estimates position parameter of vehicle A at time point (tn) based on the estimating function set of vehicle A and the detected position parameter of vehicle A at time point (t0), $x_A(t0)$. Thus, at time point (tn), communication device A can compare the estimated position parameter of vehicle A, $x_A(tn)$, with the detected position parameter of vehicle A, $x_A(tn)$. Moreover, communication device A 21 can determine whether the detected position parameter of vehicle A at time point (t0) should be transmitted to communication device B 23 based on a predefined threshold (Δd_th). When communication device A determines that a difference between the estimated position parameter of vehicle A at time point (tn), $x_A(tn)$, and the detected position parameter of vehicle A, $x_A(tn)$, is relatively small (smaller than or equivalent to the predefined threshold, $|x_A(tn)'-x_A(tn)|\leq\Delta d\_th$), communication device A 21 determines that the detected position parameter of vehicle A at time point (t0), $x_A(tn)$, is not necessary to be sent to communication device B 23. Comparatively, when the difference is relatively big (bigger than the predefined threshold, $|x_A(tn)'-x_A(tn)|>\Delta d\_th$), communication device A 21 determines that the detected position parameter of vehicle A at time point (tn), $x_A(tn)$, needs to be sent to communication device B.

In FIG. 5, position parameter of the vehicle is illustrated as an example of movement parameter that is used for comparison and determination. However, in practical application, other movement parameters can be selected for comparison as well. For example, change of movement parameters such as variance of velocity parameter (whether the variance of velocity parameter is greater than 0.5 m/s) or shift of direction angle (whether the shift of direction angle parameter is greater than 4 degrees) etc. can be referred as bases of comparison and determination. Selection of the movement parameter and/or setting of the predefined threshold can be freely adjusted in response to different applications. Furthermore, different values of the predefined threshold can be set in correspondence with different estimating function sets. For example, if the first estimating function set is selected, a relatively strict predefined threshold is set, and vice versa. The determination, selection and setting of the predefined threshold are not limited but can be freely adjusted.

Figure 6:
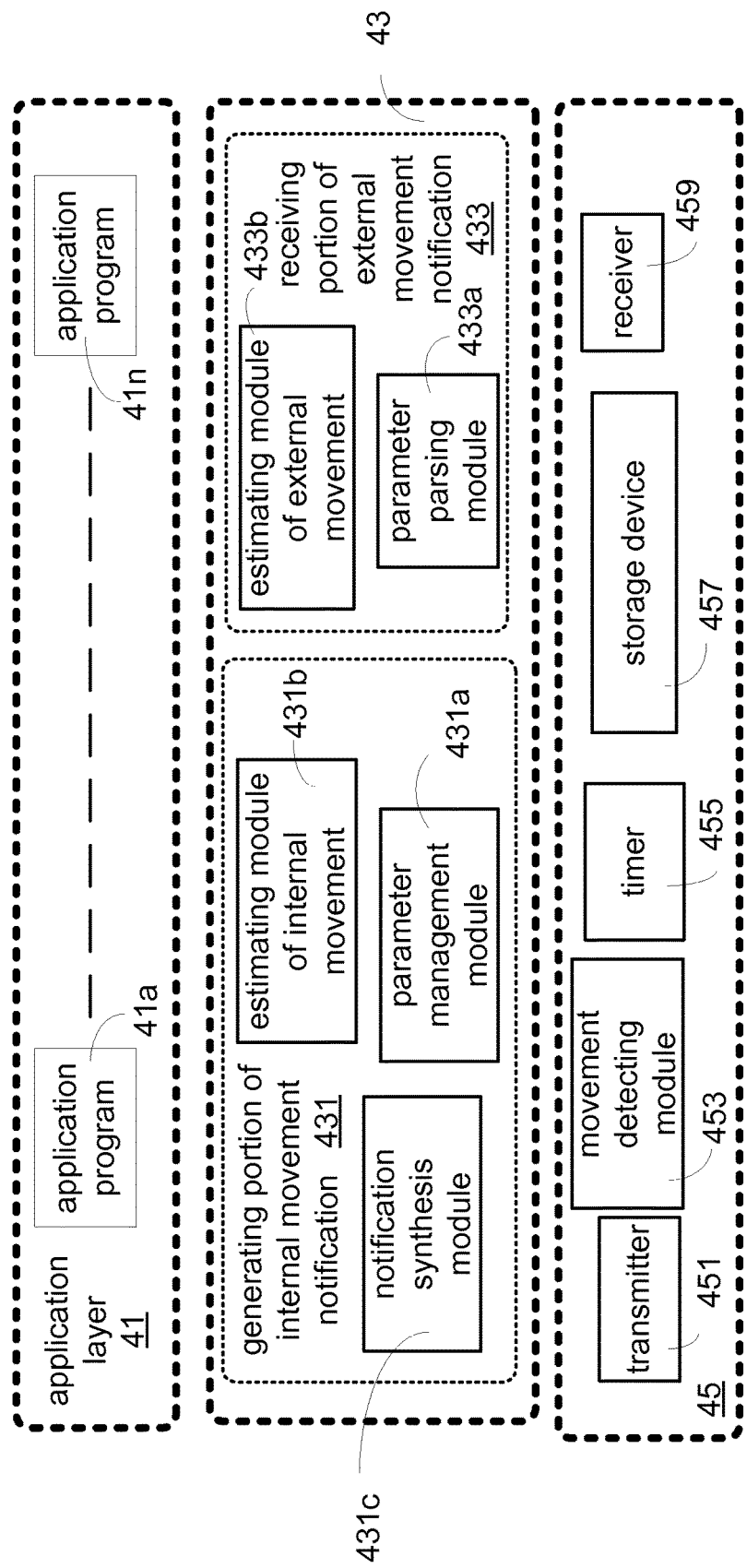
FIG. 6 is a schematic diagram illustrating layer structure and direction of data/signal flow of the communication device according to an exemplary embodiment of the present disclosure.

FIG. 6 is a schematic diagram illustrating layer structure and direction of data/signal flow of the communication device according to an embodiment of the present disclosure. The layer structure of the communication device can be roughly classified as an application layer 41, a firmware layer 43 and a hardware layer 45. The application layer 41 may include multiple application programs 41a, 41n which are executed by the controller 201. The firmware layer 43 is executed by the controller 201 in order to control the hardware layer 45. The firmware layer 43 can be divided into a generating portion of internal movement notification 431 and a receiving portion of external movement notification 433. The generating portion of internal movement notification 431 is responsible for generating an outward movement notification (MSG_out), which represents movement of the moving device where the communication device is placed. The receiving portion of external movement notification 433 receives the inward movement notification (MSG_in) which is originated from other communication device(s) and related to other moving device(s). The hardware layer 45 can include a transmitter 451, a movement detecting module 453, a timer 455, a storage device 457 and a receiver 459. According to an embodiment of the present disclosure, the communication devices being placed at moving devices are configured and capable of transmitting and receiving the movement parameter(s).

Figure 7A:
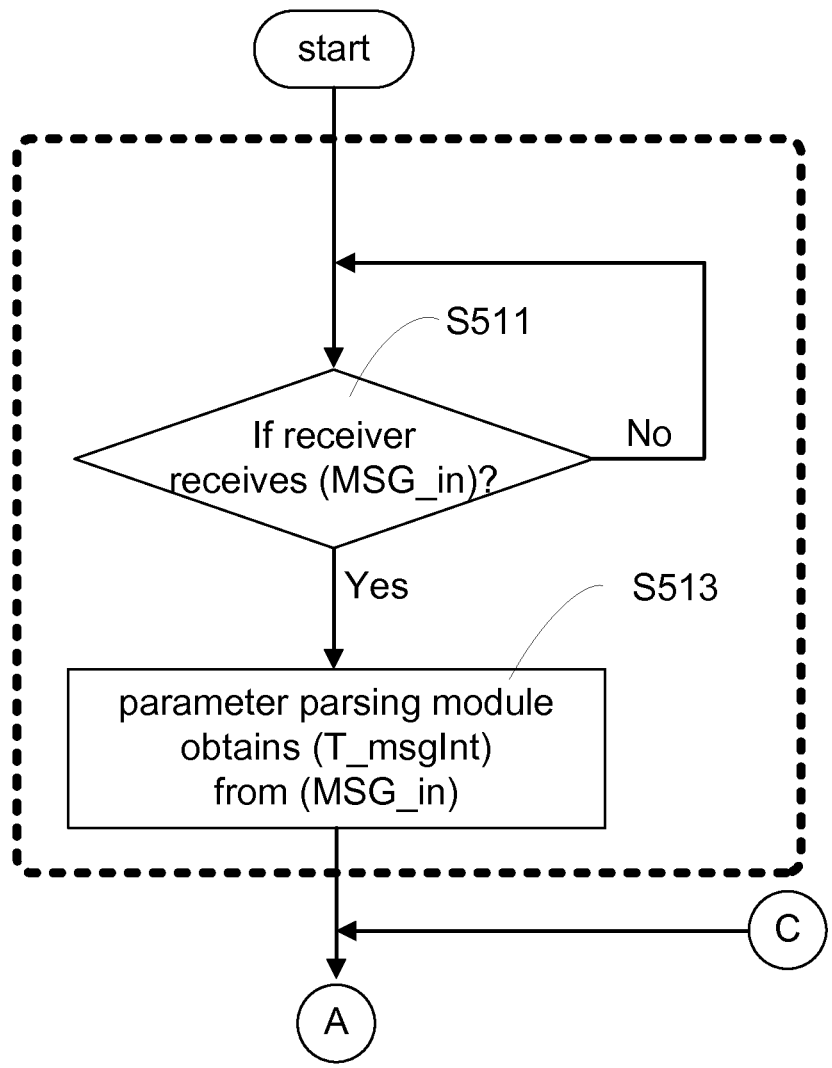
FIGS. 7A, 7B and 7C are flowcharts illustrating how the communication device transmits the movement parameter to other communication device through the outward movement notification according to an exemplary embodiment of the present disclosure.
Figure 7B:
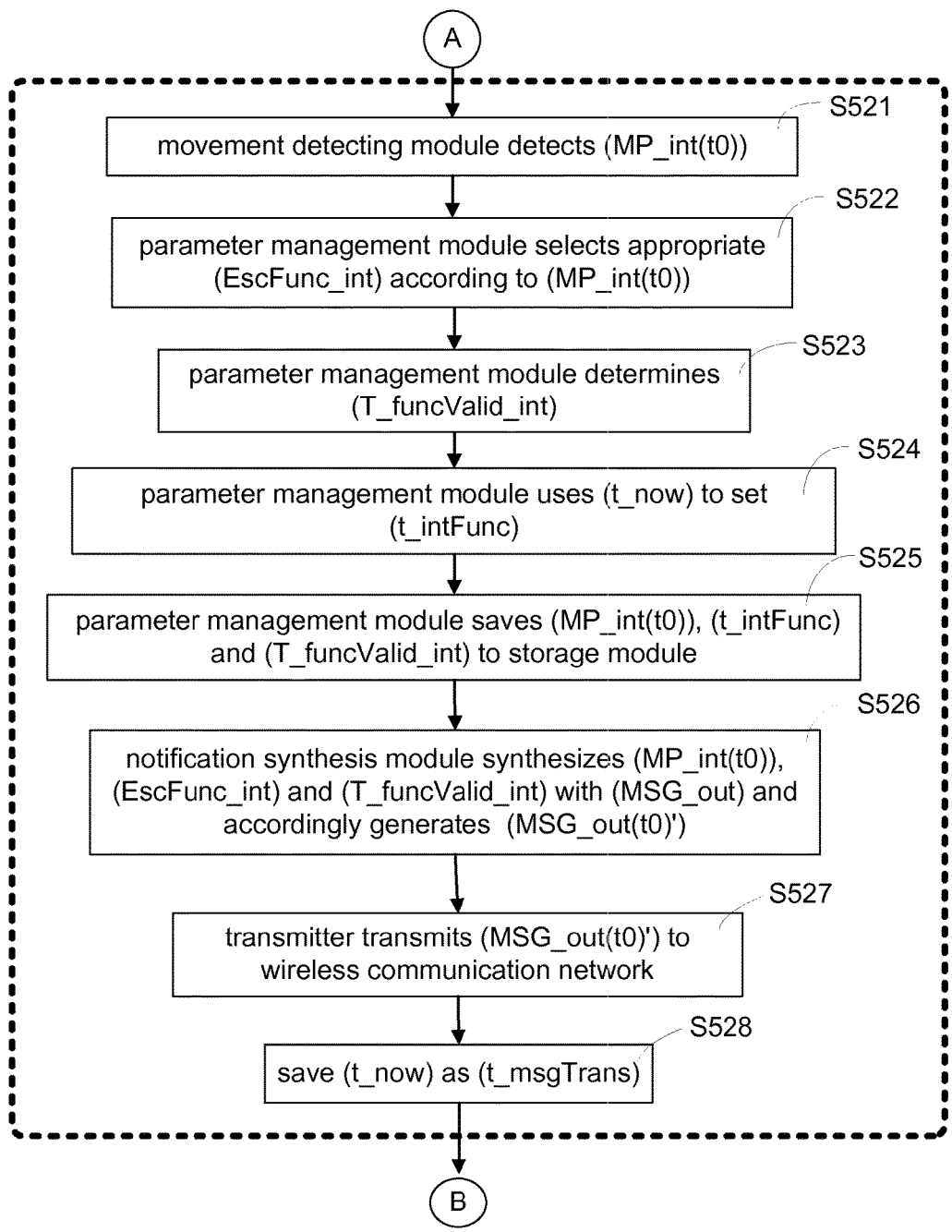
Figure 7C:
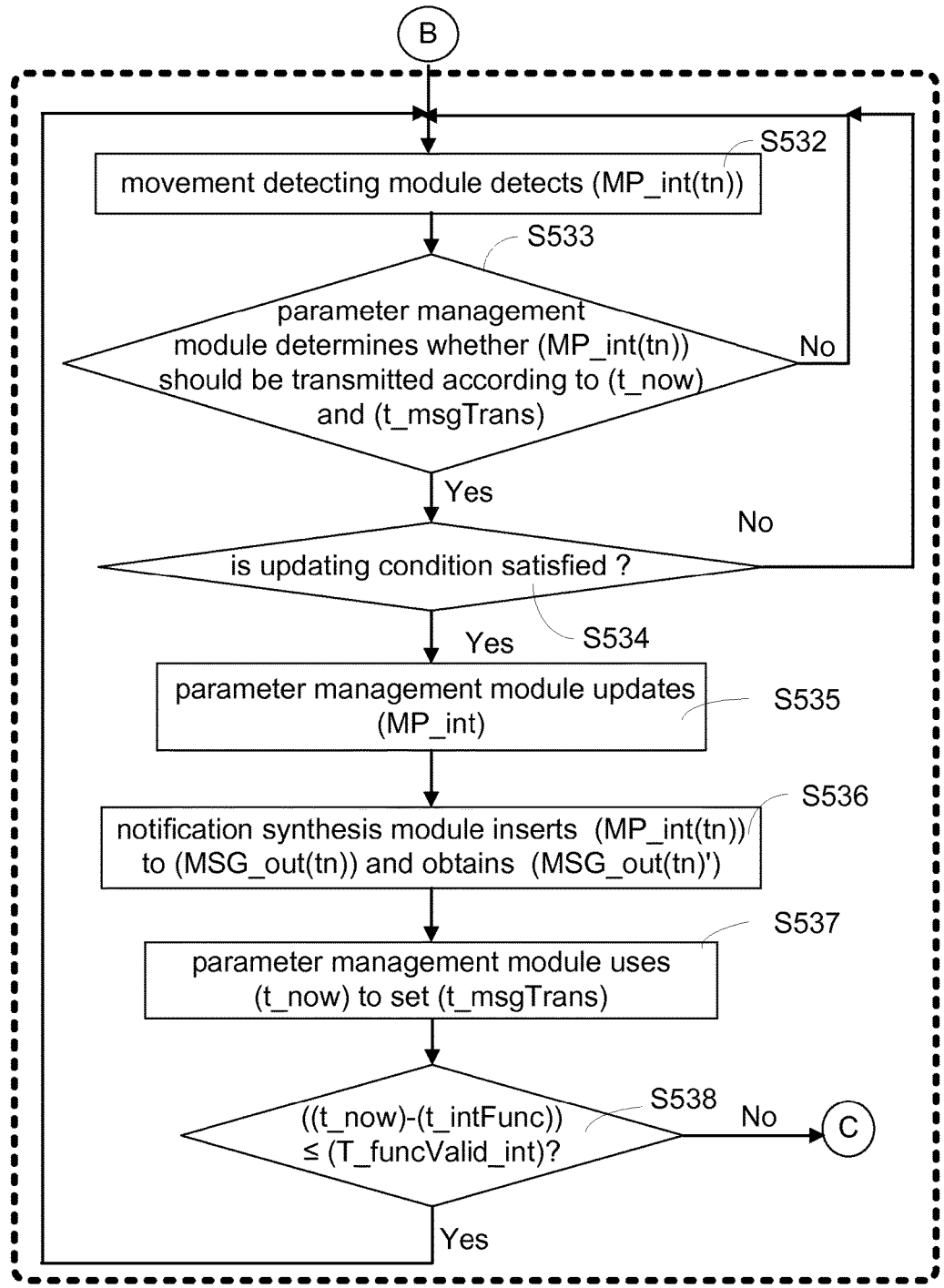

FIGS. 7A, 7B and 7C are flowcharts illustrating how the communication device transmits the movement parameter to other communication device through the outward movement notification according to an embodiment of the present disclosure. For the sake of simplicity, some steps are omitted and not shown in FIGS. 7A, 7B and 7C. In addition, it is noteworthy that sequence of steps shown in FIGS. 7A, 7B and 7C should not be limited. Moreover, the related variables mentioned below can be stored to the storage module 457, or stored to the register by the controller. In other words, according to an embodiment of the present disclosure, variations can be made in correspondence with different applications. When the communication device placed at the moving device is served as a source, the process of transmitting the outward movement notification (MSG_out) to the communication device placed at the other moving device which is served as a destination device may include three flows. Take the scenario in FIG. 1 as an example, communication device A is the source device, and communication device B is the destination device. In addition, the vehicle equipped with the source device (for example, vehicle A in FIG. 1) is defined as a first moving device, and the vehicle equipped with the destination device (for example, vehicle B in FIG. 1) is defined as a first moving device.

The flow shown in FIG. 7A represents a procedure to receive the transmission interval of outward movement notification (T_msgInt) from an exterior device (such as a base station). The transmission interval of outward movement notification (T_msgInt) is a predefined time interval, for example 0.1 millisecond, being set to avoid the channel congestion of the wireless communication network. The flow shown in FIG. 7A can be executed as soon as the communication device is connected to the wireless communication network. Second, the flow shown in FIG. 7B represents a procedure that after the communication device generates the internal movement parameter (MP_int) the first time, how the internal movement parameter (MP_int) is stored to generate the outward movement notification (MSG_out). Third, the flow shown in FIG. 7C represents that after the internal movement parameter (MP_int) is generated, how does the controller determine that the stored internal movement parameter (MP_int) should be updated and the generation of the outward movement notification (MSG_out). The steps executed by the communication device in FIGS. 7A, 7B and 7C are respectively corresponding to data/signal flow shown in FIGS. 8, 9 and 10. For the sake of simplicity, only components related to corresponding steps are shown in FIGS. 8, 9 and 10, and the direction of arrows stand for direction of data/signal flow.

Figure 8:
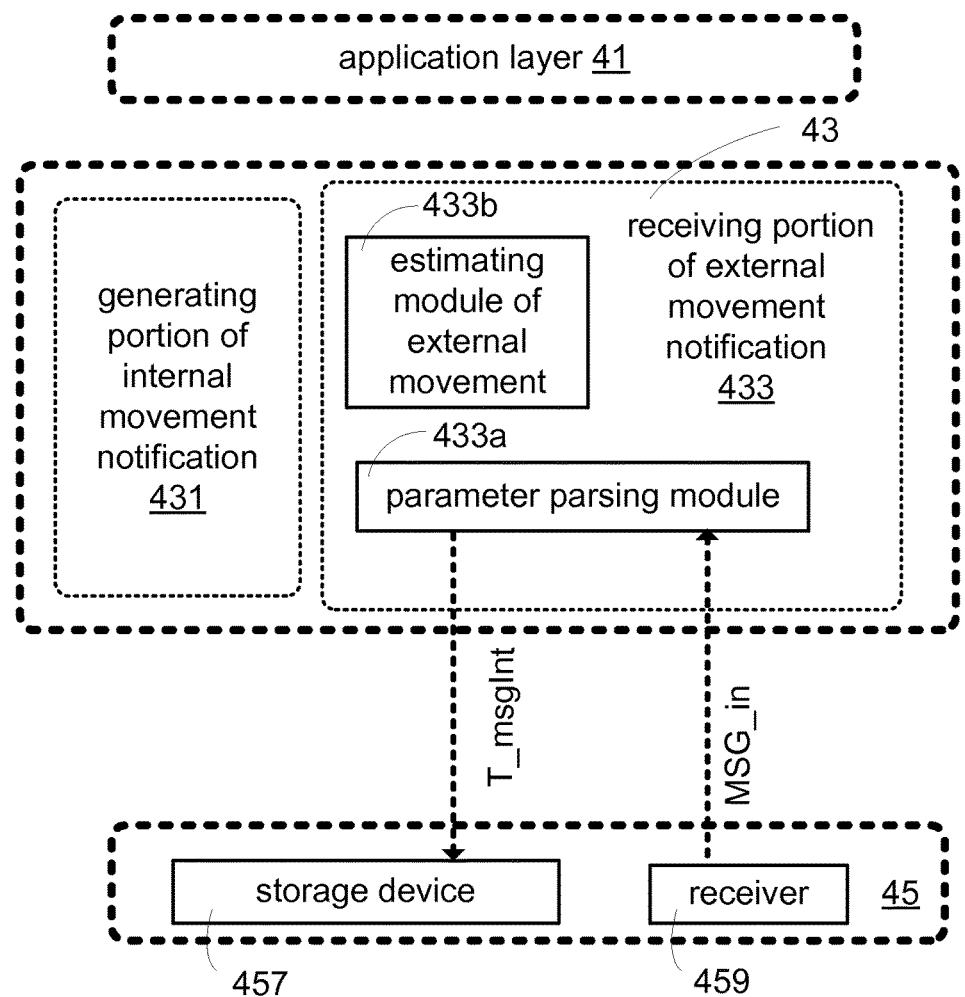
FIG. 8 is a schematic diagram illustrating data/signal flow of the communication device while steps in FIG. 7A are executed.

FIG. 8 is a schematic diagram illustrating data/signal flow of the communication device while steps in FIG. 7A are executed. Please refer to the steps shown in FIG. 7A, and the data/signal flow between the components shown in FIG. 8 together. First, the receiver 459 determines whether the inward movement notification (MSG_in) is received from the wireless communication network (step S511). If the determination result of step S511 is negative, step S511 is repeatedly executed. If the determination result of step S511 is positive, the parameter parsing module 433a extracts and acquires the transmission interval of outward movement notification (T_msgInt) from the inward movement notification (MSG_in) (step S513). It is assumed that the transmission interval of outward movement notification (T_msgInt) is 0.1 millisecond.

Figure 9:
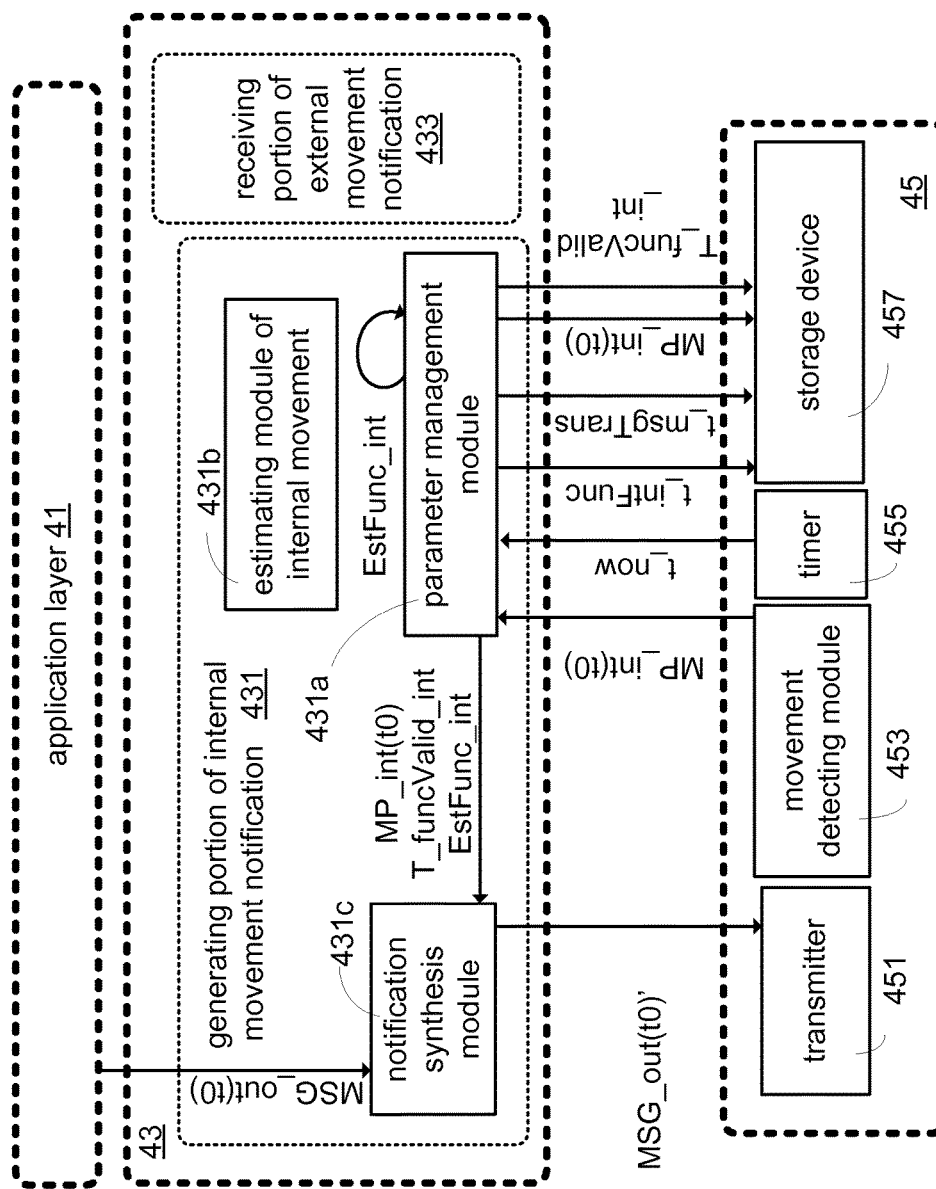
FIG. 9 is a schematic diagram illustrating data/signal flow of the communication device while steps in FIG. 7B are executed.
Figure 10:
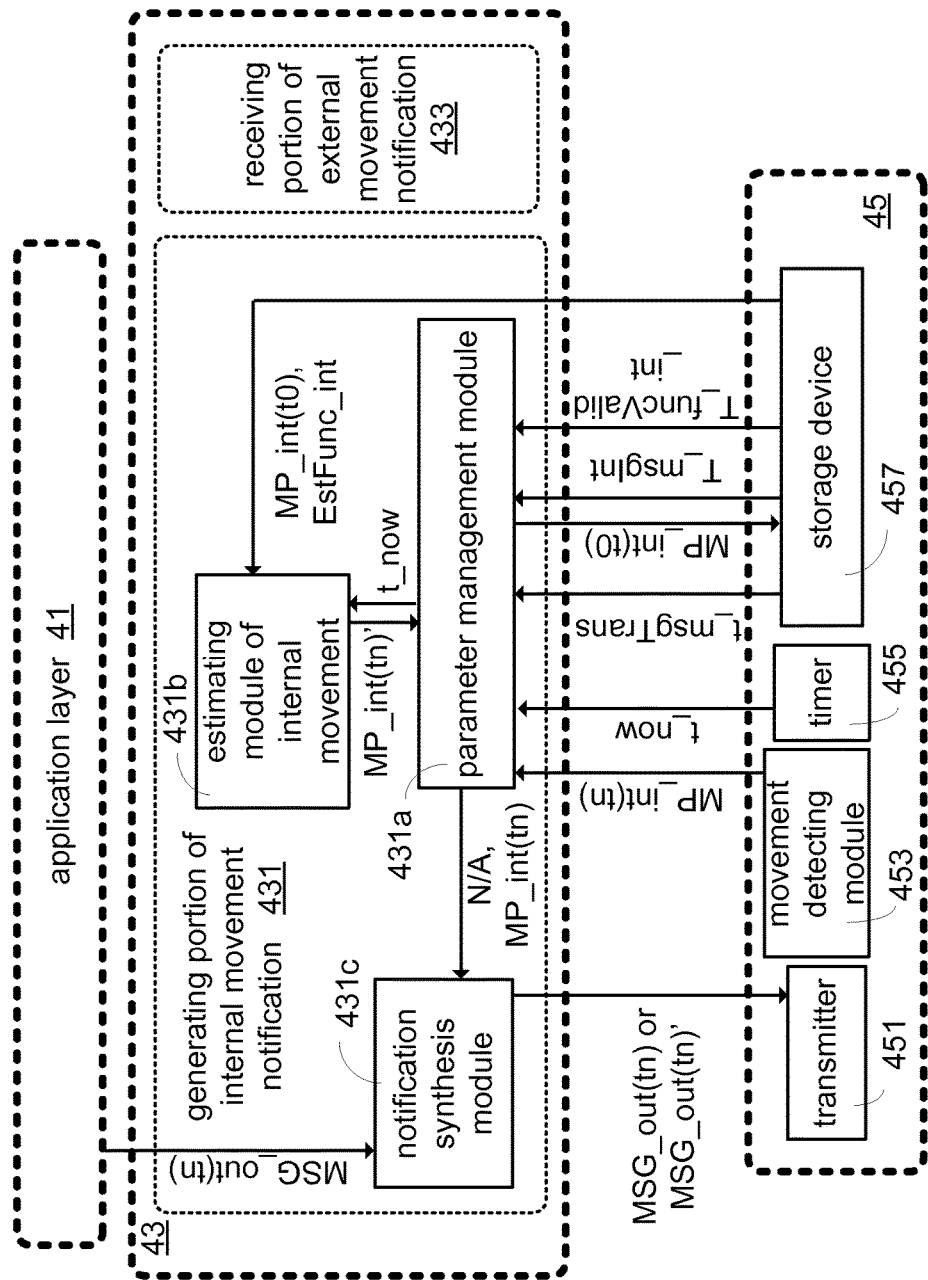
FIG. 10 is a schematic diagram illustrating data/signal flow of the communication device while steps in FIG. 7C are executed.

FIG. 9 is a schematic diagram illustrating data/signal flow of the communication device while steps in FIG. 7B are executed. Please refer to the steps shown in FIG. 7B, and the data/signal flow between the components shown in FIG. 9 together. For the sake of illustration, the representation of data and signals are briefly explained. First, the denotations related to the time signals can be classified into two types. The first type of timing signals represent a threshold value to be set, and value of these timing signals remain constant for certain duration after being set. The first type of timing signals are named with "T_". The second type of timing signals represent dynamic variables whose value always change with the timer, and the second type of timing signals are named with "t_".

Furthermore, the timing variable (t0) represents the time point that when the internal movement parameter is detected and the estimating function set (for example, the internal movement parameter is generated at the first time) is updated. The timing variable (tn) represents the time point that the internal movement parameter is detected but the internal estimating function set (EstFunc_int) is not updated. The internal movement parameter (MP_int(t0)) represents an internal movement parameter (MP) being generated at time point (t0). And the internal movement parameter (MP_int(tn)) represents another internal movement parameter (MP) being generated at time point (tn). The internal movement parameter (MP_int(t0)) can be defined as a first movement parameter, and the internal movement parameter (MP_int(tn)) can be defined as a second movement parameter.

After detecting the internal movement parameter (MP_int (t0)) (step S521), the movement detecting module 453 transmits the internal movement parameter (MP_int(t0)) to the parameter management module 431a. Being detected by the movement detecting module 453 at time point (t0), the internal movement parameter (MP_int(t0)) can be considered as the first movement parameter. According to the internal movement parameter (MP_int(t0)), the parameter management module 431a selects an appropriate estimating function set as the internal estimating function set (EstFunc_int) (step S522). The parameter management module 431a can further determine a duration as the effective interval of internal estimating function set (T_funcValid_int) according to value, and number and/or type of the internal movement parameter (MP_int(t0)) (step S523). Besides, the parameter management module 431a can save the effective interval of internal estimating function set (T_funcValid_int) to the storage module 457.

After receiving a current time (t_now) from the timer 455, the parameter management module 431a sets an initial time of the internal estimating function set (t_intFunc) as the current time (t_now) (step S524), that is, intFunc=t_now. Then, the parameter management module 431a saves the internal movement parameter (MP_int(t0)), the initial time of internal estimating function set (t_intFunc), and the effective interval of internal estimating function set (T_funcValid_int) to the storage module 457 (step S525). Furthermore, the parameter management module 431a forwards the internal movement parameter (MP_int(t0)), the selected internal estimating function set (EstFunc_int), and the effective interval of internal estimating function set (T_funcValid_int) to the notification synthesis module 431c.

According to information and communication technologies-Intelligent Transport Systems (hereinafter, TC-ITS) defined by European Telecommunications Standards Institute (hereinafter, ETSI), a header of the outward movement notification (MSG_out) can include reserved fields. The reserved fields can be used for transmitting additional information such as the movement parameter. The notification synthesis module 431c receives the outward movement notification (MSG_out(t0)) to be transmitted to other communication devices from the application layer 41. Then, the notification synthesis module 431c synthesizes the internal movement parameter (MP_int(t0)) provided by the parameter management module 431a, the selected internal estimating function set (EscFunc_int), and the effective interval of internal estimating function set (T_funcValid_int) together with the outward movement notification (MSG_out) and accordingly generates a synthesized outward movement notification (MSG_out(t0)) (step S526). After the synthesized outward movement notification (MSG_out(t0)') is generated, the notification synthesis module 431c passes the synthesized outward movement notification (MSG_out (t0)') to the transmitter 451, and the transmitter 451 further transmits the synthesized outward movement notification (MSG_out(t0)') to the wireless communication network (step S527). The synthesized outward movement notification (MSG_out(t0)') transmitted by transmitter 451 at time point (t0) is defined as the first movement notification.

Meanwhile, the parameter management module 431a records the time point that the transmitter 451 transmits the outward movement notification (MSG_out), that is, the time point of transmitting outward notification (t_msgTrans). In other words, the current time (t_now) provided by the timer 455 is saved as the time point of transmitting outward notification (t_msgTrans) (step S528). That is, t_msgTrans=t_now.

FIG. 10 is a schematic diagram illustrating data/signal flow of the communication device while steps in FIG. 7C are executed. Please refer to the steps shown in FIG. 7C, and the data/signal flow between the components shown in FIG. 10 together. The movement detecting module 453 detects again the internal movement parameter (MP_int(tn)) at time point (tn) (step S532). The internal movement parameter (MP_int (tn)) detected at time point (tn) is considered as the second movement parameter. Furthermore, the parameter management module 431a respectively receives the time point of transmitting outward notification (t_msgTrans) and the transmission interval of the outward movement notification (T_msgInt) from the storage device 457, and obtains the current time (t_now) from the timer 455.

After receiving the internal movement parameter MP_int (tn)) from the movement detecting module 453, the parameter management module 431a determines whether the newly detected internal movement parameter (MP_int(tn)) should be transmitted to other communication device(s) according to the current time (t_now) and the time point of transmitting outward notification (t_msgTrans) (step S533). In vehicular communication system, this step can prevent the movement parameter from being transmitted too frequent so that the channel will not be congested. Thus, the parameter management module 431a executes the following steps only if a time difference between the current time (t_now) and the time point of transmitting outward notification (t_msgTrans) is greater than the transmission interval of outward movement notification (T_msgInt) (for example 0.1 ms). Otherwise, if the determination result of step S533 is negative, the movement detecting module 453 may discard the detected internal movement parameter (MP_int(tn)) and detect again the internal movement parameter (MP_int (tn)) at a later time point.

Then, at time point (tn), the estimating module of internal movement 431b estimates the estimated internal movement parameter (MP_int(tn)) according to the internal movement parameter (MP_int(t0)) and the internal estimating function set (EscFunc_int) stored in the storage device 457. The parameter management module 431a determines whether an updating condition is satisfied by comparing the internal movement parameter (MP_int(t0)) with the internal movement parameter (MP_int(tn)) (step S534). The updating condition stands for the condition that the internal movement parameter (MP_int(tn)) should be sent to other communication devices to update the internal movement parameter (MP_int(t0)) sent before.

According to an embodiment of the present disclosure, the communication device A estimates position parameter of vehicle A at time point (tn) based on the internal movement parameter (MP_int(t0)) and the internal estimating function set (EstFunc_int). Accordingly, the communication device A generates the estimated internal movement parameter (MP_int(tn)') corresponding to vehicle A at time point (tn). When a difference between the estimated internal movement parameter (MP_int(tn)') and the detected internal movement parameter (MP_int(tn)) is too large, it implies that moving pattern of vehicle A has been changed and the internal movement parameter (MP_int(t0)) is no longer suitable for estimating practical movement of vehicle A at time point (tn). In such case, communication device B cannot use the internal movement parameter (MP_int(t0)) to estimate the position parameter of vehicle A. If the internal movement parameter (MP_int(t0)) is used for estimation, communication device B will incorrectly estimate position parameter of vehicle A at time point (tn). In such case, communication device A needs to update the internal movement parameter (MP_int(tn)) to communication device B.

Therefore, when the estimated internal movement parameter (MP_int(tn)') is generated by the parameter management module 431a of communication device A, and the internal movement parameter (MP_int(tn)) is detected, the parameter management module 431a determines the updating condition as satisfied if a difference between the estimated internal movement parameter (MP_int(tn)') and the newly detected internal movement parameter (MP_int(tn)) is greater than a predefined threshold. On the other hand, if the parameter management module 431a of communication device A determines the difference between the estimated internal movement parameter (MP_int(tn)') and the newly detected internal movement parameter (MP_int(tn)) is tolerable, the updating condition is determined as not satisfied.

If the updating condition is not satisfied, step S532 is repeatedly executed. If the updating condition is satisfied, the parameter management module 431a transmits the newly detected internal movement parameter (MP_int(tn)) to the notification synthesis module 431c. The parameter management module 431 also uses the newly detected internal movement parameter (MP_int(tn)) to update the internal movement parameter (MP_int) stored in the storage device 457 (step S535). As illustrated above, communication device A transmits the newly detected internal movement parameter (MP_int(tn)) selectively according to comparison between the detected internal movement parameter (MP_int(tn)) and the estimated internal movement parameter (MP_int(tn)'). When a difference between the detected internal movement parameter (MP_int(tn)) and the estimated internal movement parameter (MP_int(tn)') is greater than the predefined threshold, the newly detected internal movement parameter (MP_int(tn)) will be transmitted with the outward movement notification (MSG_out(tn)). Otherwise, the newly detected internal movement parameter (MP_int(tn)) is discarded and not transmitted to communication device B.

If the parameter management module 431a does not transmit the detected internal movement parameter (MP_int(tn)) to the notification synthesis module 431c, the transmitter 451 simply transmits the movement notification (MSG_out(tn)) received from the application layer 41 to the wireless communication network. On the other hand, if the notification synthesis module 431c receives the detected internal movement parameter (MP_int(tn)) from the parameter management module 431a, the notification synthesis module 431c inserts the detected internal movement parameter (MP_int(tn)) to the outward movement notification (MSG_out(tn)) and obtains the synthesized outward movement notification (MSG_out(tn)') (step S536). Meanwhile, the transmitter 451 transmits the synthesized outward movement notification MSG_out(tn) to the wireless communication network. The outward movement notification MSG_out(tn)' transmitted by the transmitter 451 at time point (tn) is defined as the second movement notification.

In addition to determining whether the internal movement parameter (MP_int(tn)) should be transmitted, the steps in FIG. 7B update and maintain the internal variables as well. When the transmitter 451 transmits the synthesized outward movement notification MSG_out(tn') to the wireless communication network, the parameter management module 431 sets the time point of transmitting outward notification (t_msgTrans) as the current time (t_now) (step S537). That is, the time point that the transmitter 451 transmits the outward movement notification is recorded. The current time (t_now) is available at the timer. Besides, the parameter management module 431 needs to determine whether the previously selected internal estimating function set (EstFunc_int) is still effective (step S538). If a time difference between the current time (t_now) and the initial time of internal estimating function set (t_intFunc) is smaller than or equivalent to the effective interval of internal estimating function set (T_funcValid_int), that is, |t_now−t_intFunc|≤T_funcValid_int, the internal estimating function set (EstFunc_int) is confirmed to be effective. If the determination result of step S538 is positive, step S532 is repeatedly executed. If the determination result of step S538 is negative, step S521 is repeatedly executed.

Figure 11A:
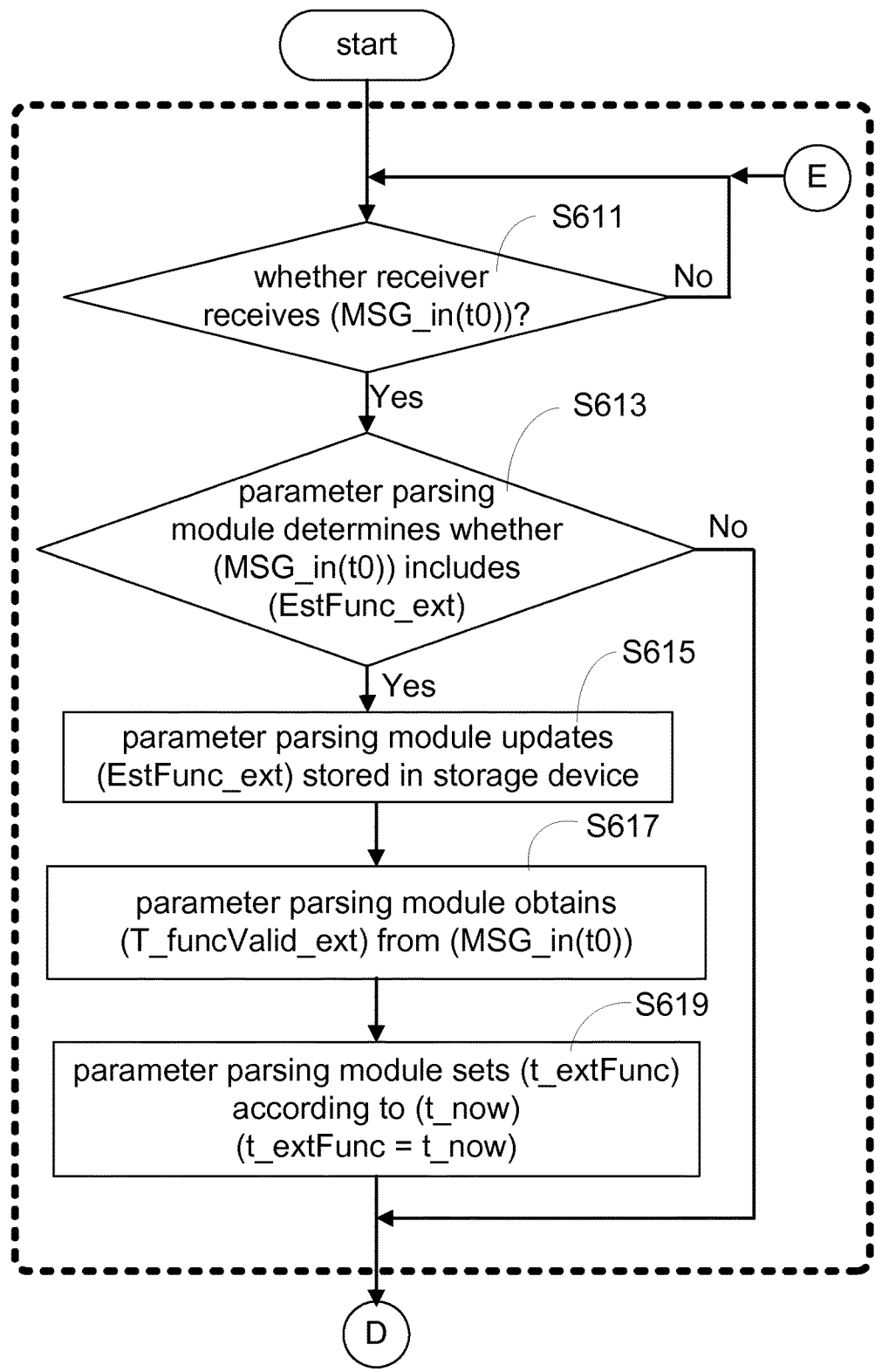
FIGS. 11A and 11B are flowcharts illustrating how the communication device receives the movement parameter from other communication device according to an exemplary embodiment of the present disclosure.
Figure 11B:
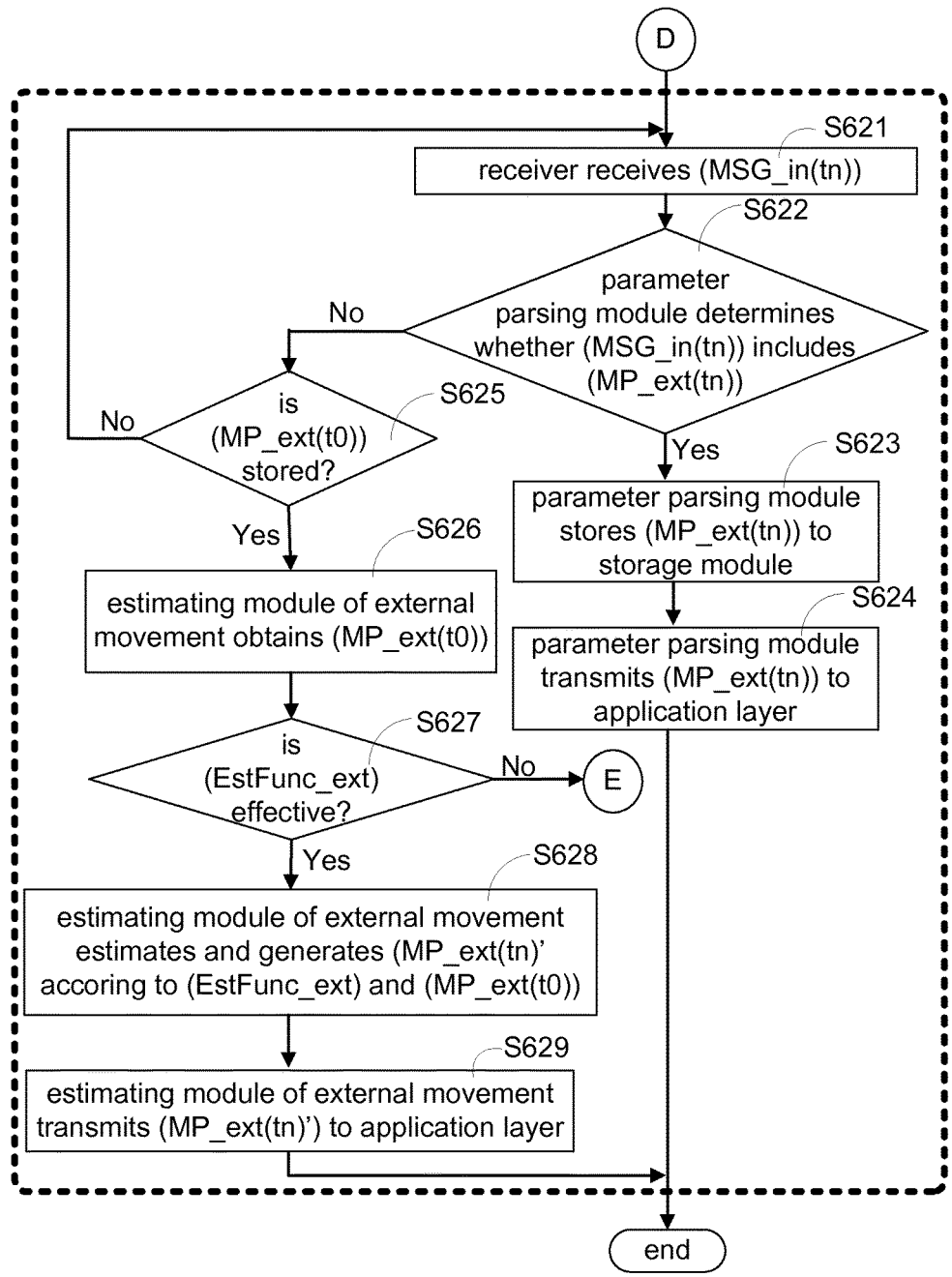

FIGS. 11A and 11B are flowcharts illustrating how the communication device receives the movement parameter from other communication device according to an embodiment of the present disclosure. For the sake of simplicity, some detail steps are omitted and not shown in FIGS. 11A and 11B. In addition, it is noteworthy that sequence of steps shown in FIGS. 11A and 11B should not be limited. Moreover, the related variables mentioned below can be stored to the storage module 457, or stored to the register by the controller. In other words, according to an embodiment of the present disclosure, variations can be made in correspondence with different applications.

Moreover, implementation of transmitting the external estimating function set (EstFunc_ext) between communication devices is not limited. For example, the communication device may directly receive the context of the external estimating function set (EstFunc_ext) from other communication device. Alternatively, the communication device may receive a selection parameter from other communication device and the selection parameter indicates which external estimating function set (EstFunc_ext) has been selected. When the communication device is a destination device (for example, communication device B), the process of receiving the external movement parameter (MP_ext) from other communication device can include two flows.

First, the flow shown in FIG. 11A is the process of receiving the external estimating function set (EstFunc_ext). The parameters related to the external estimating function set (EstFunc_ext) can include the external estimating function set (EstFunc_ext) selected by the source device and the effective interval of selected external estimating function set (T_funcValid_ext). Second, the flow shown in FIG. 11B is the process of receiving and processing the external movement parameter (MP_ext). For communication device B, the external movement parameter (MP_ext(t0)) received at time point (t0) can be considered as the first (external) movement parameter; and the external movement parameter (MP_ext(tn)) received at time point (tn) can be considered as the second (external) movement parameter. The steps of the two flows shown in FIGS. 11A and 11B are respectively corresponding to the data/signal flow of FIGS. 12 and 13. Thus, FIGS. 11A and 11B are respectively illustrated together with FIGS. 12 and 13. For the sake of simplicity, only components related to corresponding steps are shown in FIGS. 12 and 13, and the direction of arrows stand for direction of data/signal flow.

Figure 12:
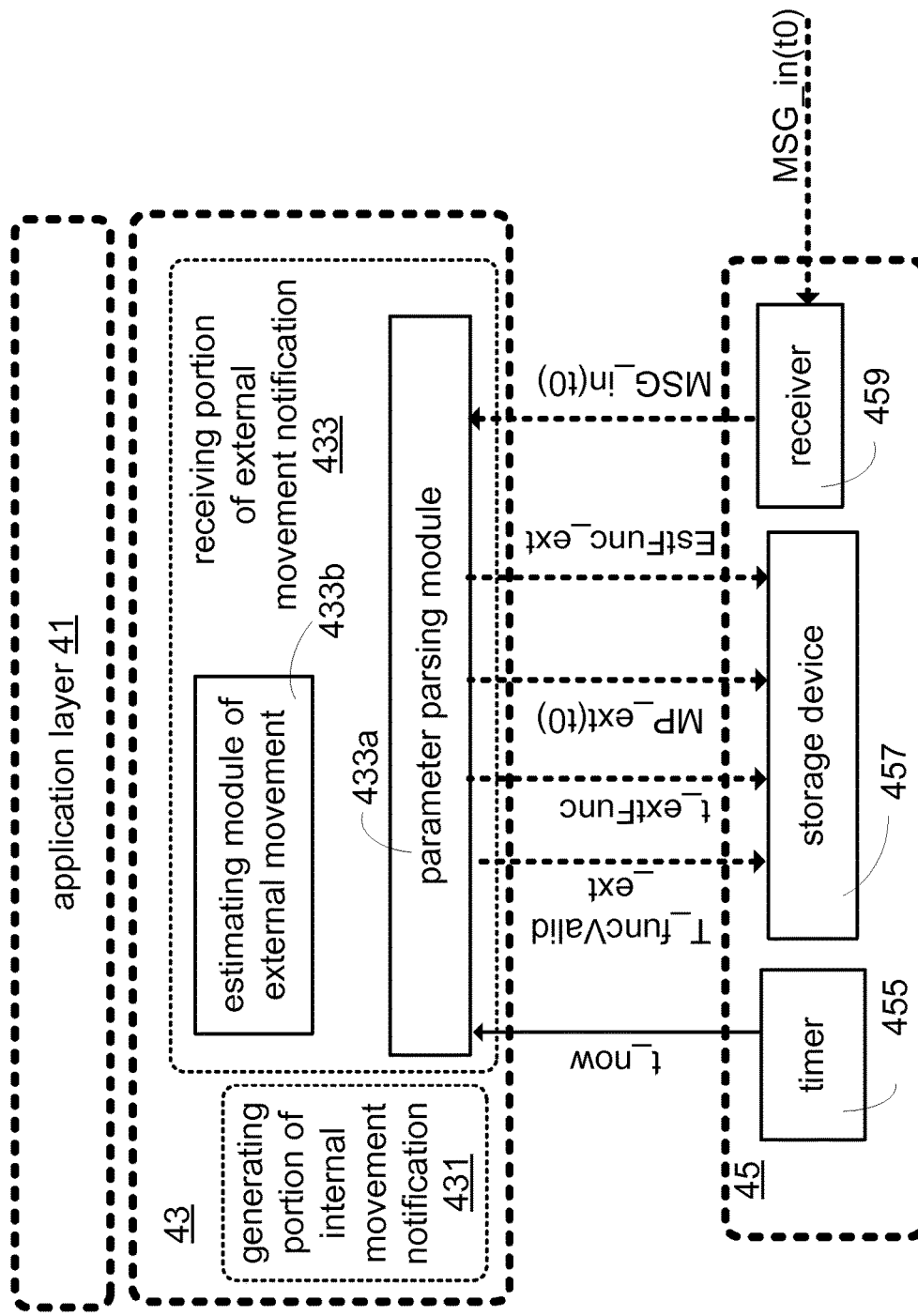
FIG. 12 is a schematic diagram illustrating data/signal flow of the communication device while steps in FIG. 11A are executed.

FIG. 12 is a schematic diagram illustrating data/signal flow of the communication device while steps in FIG. 11A are executed. Please refer to the steps shown in FIG. 11A, and the data/signal flow between the components shown in FIG. 12 together. First, decide whether the receiver 459 receives the inward movement notification (MSG_in(t0)) is determined (step S611). If not, step S611 is repeatedly executed. After receiving the inward movement notification (MSG_in(t0)), the receiver 459 transmits the received inward movement notification (MSG_in(t0)) to the parameter parsing module 433a, so that the parameter parsing module 433a can analyze the inward movement notification (MSG_in(t0)) and determine whether the inward movement notification (MSG_in(t0)) includes another external estimating function set (EstFunc_ext) for update (step S613). If not, steps S615, S617, S619 can be omitted.

If the determination result of step S613 is positive, the parameter parsing module 433a updates the external estimating function set (EstFunc_ext) stored in the storage device 457 (step S615). Furthermore, after obtaining the effective interval of external estimating function set (T_funcValid_ext) from the inward movement notification (MSG_in(t0)) (step S617), the parameter parsing module 433a sets an initial time of external estimating function set (t_extFunc) according to the current time (t_now) provided by the timer 455 (step S619). Besides, the parameter parsing module 433a obtains the effective interval of the external estimating function set (T_funcValid_ext) from the inward movement notification (MSG_in(t0)), and stores a copy of the effective interval of the external estimating function set (T_funcValid_ext) to the storage device 457.

Figure 13:
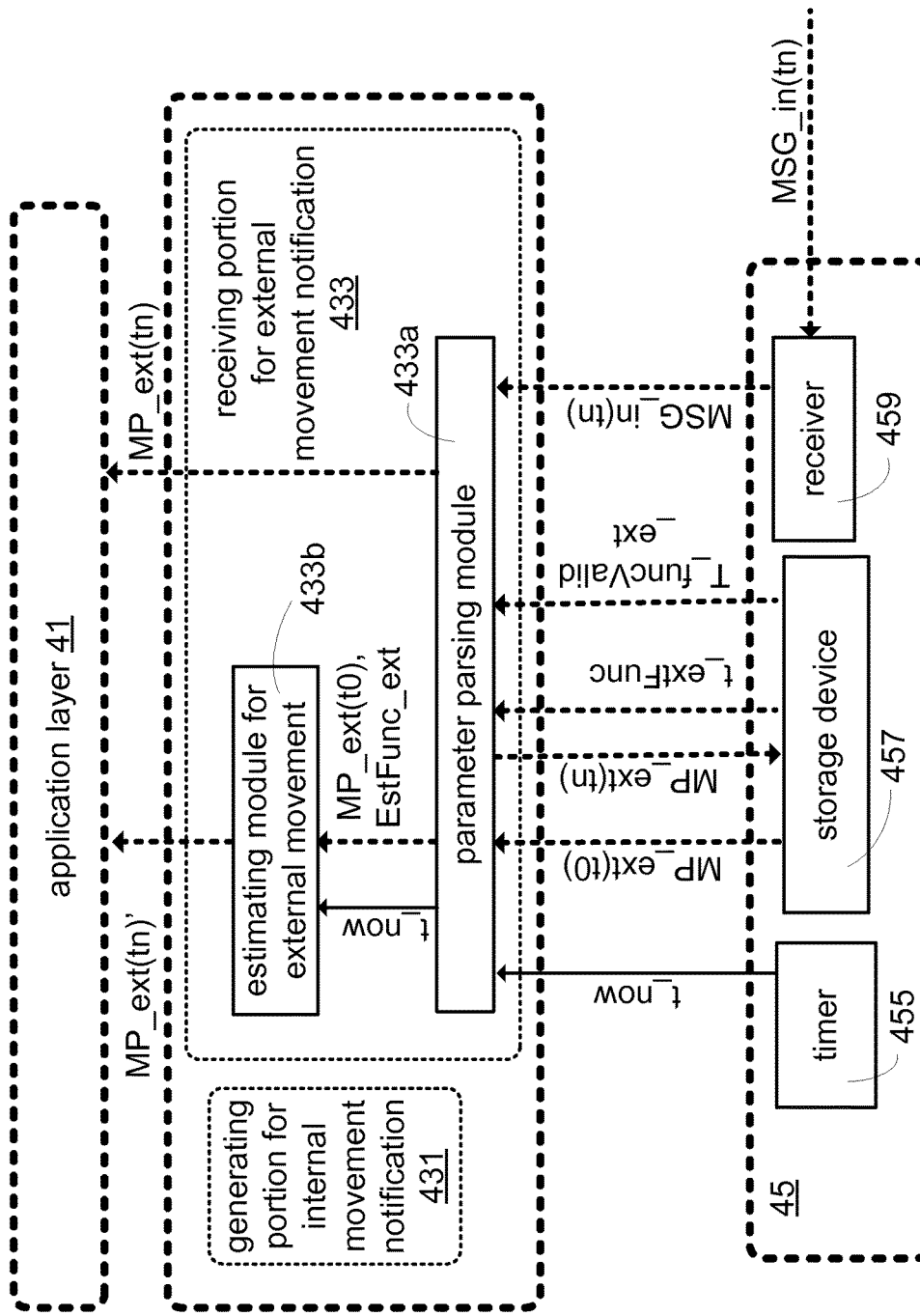
FIG. 13 is a schematic diagram illustrating data/signal flow of the communication device while steps in FIG. 11B are executed.

FIG. 13 is a schematic diagram illustrating data/signal flow of the communication device while steps in FIG. 11B are executed. Further refer to the steps shown in FIG. 11B, and the data/signal flow between the components shown in FIG. 13 together. After receiving the inward movement notification (MSG_in(tn)) at time point (tn) (step S621), the receiver 459 transmits the inward movement notification (MSG_in(tn)) to the parameter parsing module 433a. The parameter parsing module 433a determines whether the inward movement notification (MSG_in(tn)) includes the external movement parameter (MP_ext(tn)) (step S622). It should be noted that, the internal movement parameter (MP_int(t0)) transmitted by communication device A is considered as the external movement parameter (MP_ext(t0)) by communication device B. Similarly, communication device B considers the internal estimating function set (EstFunc_int) originated from communication device A as the external estimating function set (EstFunc_ext).

If the determination result of step S622 is positive, the parameter parsing module 433a stores the external movement parameter (MP_ext(tn)) to the storage module 457 (step S623), and transmits the external movement parameter (MP_ext(tn)) to the application layer 41 (step S624).

If the determination result of step S622 is negative, the parameter parsing module 433a further determines whether the storage device 457 stores the external movement parameter (MP_ext(t0)) (that is, the first movement parameter) (step S625). If not, step S621 is executed again. If the original external movement parameter (MP_ext(t0)) exists in the storage device 457, the parameter parsing module 433a obtains the stored external movement parameter (MP_ext(t0)) from the storage module 457. Then, the parameter parsing module 433a transmits the stored external movement parameter (MP_ext(t0)) to the estimating module of external movement 433b (step S626).

Then, the parameter parsing module 433a determines whether the external estimating function set (EstFunc_ext) is still effective (step S627). The parameter parsing module 433a determines whether the external estimating function set (EstFunc_ext) is effective by comparing a time difference between the current time (t_now) and the initial time of external estimating function set (t_extFunc) with an effective interval of external estimating function set (T_funcValid_ext). If the time difference between the current time (t_now) and the initial time of external estimating function set (t_extFunc) is greater than the effective interval of external estimating function set (T_funcValid_ext), the previously received the external estimating function set (EstFunc_ext) is considered as invalid. Meanwhile, the step S611 is executed again.

If the determination result of step S627 is positive, the parameter parsing module 433a transmits the current time (t_now), the external estimating function set (EstFunc_ext), and the external movement parameter (MP_ext(t0)) to the estimating module of external movement 433b. After the estimating module of external movement 433b estimates external movement of the other communication device, the estimated external movement parameter (MP_ext(tn)') is generated (step S628). For example, the estimating module of external movement 433b of communication device B estimates position parameter of vehicle A at time point (tn), according to the estimating function set selected and transmitted by communication device A. The estimating module of external movement 433b transmits the estimated external movement parameter (MP_ext(tn)') to the application layer 41 (step S629).

As describe above, when the communication device B determines that the external estimating function set (EstFunc_ext) is still effective, and the original external movement parameter (MP_ext(t0)) is not updated, both communication device A and communication device B executes the estimation procedure at time point (tn) to obtain estimated movement parameter of vehicle A. These estimation procedures are based on identical first movement parameters (MP) and identical estimating function sets (EstFunc). For communication device A, the first movement parameter is considered as the internal movement parameter (MP_int(t0)). Whereas, the first movement parameter is considered as the external movement parameter (MP_ext(t0)) by communication device B. Furthermore, the estimating function set is considered as the internal estimating function set (EstFunc_int) by communication device A, but the estimating function set is considered as the external estimating function set (EstFunc_ext) by communication device B.

Therefore, at time point (tn), communication device A calculates and generates the estimated internal movement parameter (MP_int(tn)=) based on the first movement parameter and the internal estimating function (EstFunc_int). Similarly, at time point (tn), communication device B calculates and generates the estimated external movement parameter (MP_ext(tn)') based on the first movement parameter and the external estimating function set (EstFunc_ext). That is to say, at time point (tn), communication device A calculates the estimated internal movement parameter (MP_int(tn)'), and communication device B calculates the estimated external movement parameter (MP_ext(tn)') based on identical movement parameter and identical estimating function set. Consequently, at time point (tn), the estimated internal movement parameter (MP_int(tn)') obtained by communication device A will be consistent with the estimated external movement parameter (MP_ext(tn)') obtained by communication device B.

As discussed above, communication device A transmits not only the movement parameter to communication device B, but also the effective interval of its selected estimating function set, that is, the effective interval of internal estimating function set (T_funcValid_int). After receiving the external movement parameter, communication device B determines whether the external estimating function (set) corresponding to communication device A is still effective according to whether the current time is within the effective interval. If the current time is within the effective interval, communication device B continues using the previously received external movement parameter and the external estimating function set to estimate movement parameter of vehicle A at time point t(n). If the current time exceeds the effective interval, communication device B stops using the external estimating function set to estimate position parameter of vehicle A.

Furthermore, the communication device can be used for transmitting and receiving the movement notification. Thus, the communication device generates the internal movement parameter, and receives the external movement parameter from other communication device. Take communication device A as an example, communication device A does not only generate and transmit the first movement parameter and the second movement parameter, but also receives movement parameter sent from communication device B. That is, after the movement detecting module of communication device B generates the position parameter of vehicle B, the transmitter of vehicle B transmits the movement parameter corresponding to position parameter of vehicle B to communication device A. Hereby, communication device A considers the movement parameter corresponding to vehicle B as the third movement parameter. Similarly, communication device A may estimate position parameter of vehicle B according to the estimating function set and the third movement parameter transmitted by the communication device B.

According to an embodiment of the present disclosure, the application layer 41 can acquire either the external movement parameter (MP_ext(tn)) (that is, second movement parameter) from the parameter parsing module 433a in a real time manner, or the estimated external movement parameter (MP_ext(tn)') from the estimating module of external movement 433b. The acquired external movement parameter (MP_ext(tn)) and the estimated external movement parameter (MP_ext(tn)') can be used for further application such as being visualized to demonstrate movement of other vehicles. In other words, when the receiver 459 actually receives the external movement parameter (MP_ext(tn)) from other communication devices, the application layer can use the newly received external movement parameter (MP_ext(tn)) to represent movement of other vehicles. When the receiver 459 does not receive the external movement parameter (MP_ext(tn)) from other communication devices, the application layer 41 uses the estimated external movement parameter (MP_ext(tn)') to represent movement of other vehicles.

The above layer structure is used to illustrate how data related to the communication method according to the present disclosure are utilized. In practical application, control between layers and directions of data/signal flow may be different according to different system application. For example, it is assumed that the firmware layer 43 can directly acquire the movement parameter and the timing variables from the hardware layer 45. However, in practical application, the application programs 41a, 41n can acquire the movement parameter and the timing variables from driver of the movement detecting module 453, and the application programs 41a, 41n passes the movement parameter to the firmware layer 43.

Figure 14A:
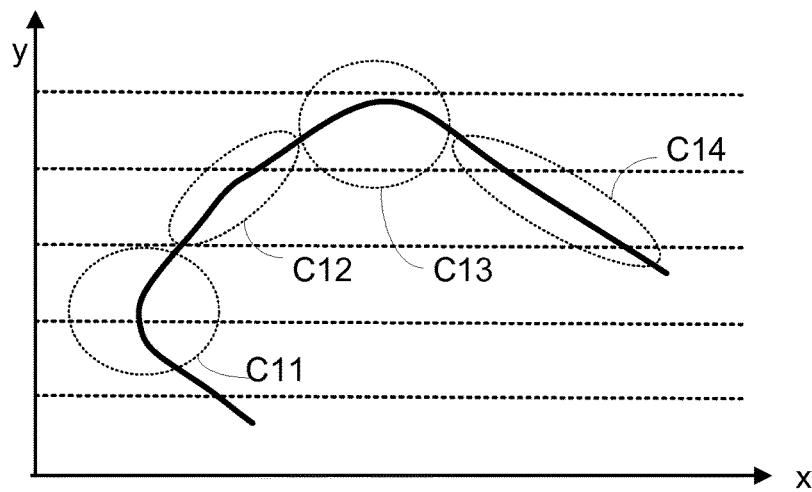
FIGS. 14A, 14B and 14C are schematic diagrams illustrating examples of different road conditions.
Figure 14B:
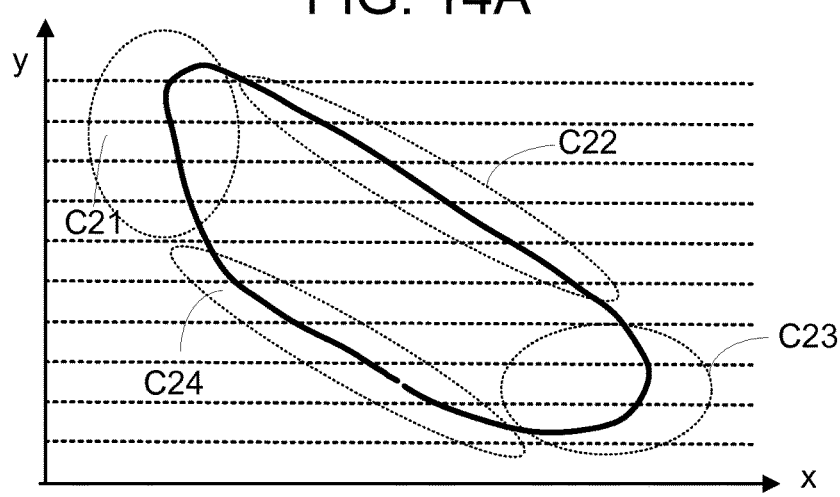
Figure 14C:
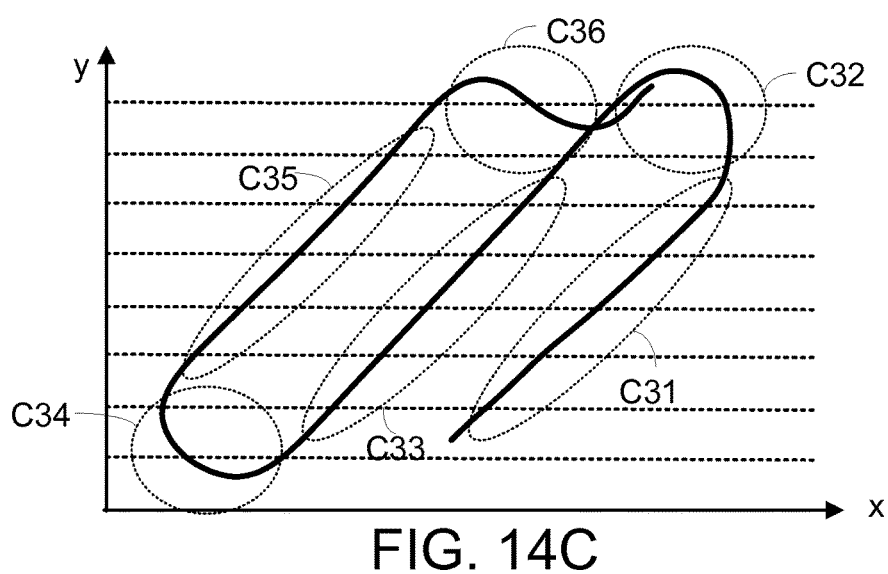

FIGS. 14A, 14B and 14C are schematic diagrams illustrating examples of different road conditions. The linear corner route shown in FIG. 14A can be divided into segments C11, C12, C13 and C14. The elliptic curve route shown in FIG. 14B can be divided into segments C21, C22, C23 and C24. The random curve route shown in FIG. 14C can be divided into segments C31, C32, C33 and C34. In FIGS. 14A, 14B and 14C, segments C12, C14, C22, C24, C31, C33, C35 are relatively straight, and segments C11, C13, C21, C23, C32, C34, C36 are relatively cursive.

As listed in Table 2, exemplary evaluation results about transmitting movement notifications with a fixed rate, a rate adjusting method according to common techniques, and a rate adjusting method according to the present disclosure are compared. These comparisons are based on the road conditions shown in FIGS. 14A, 14B and 14C.

TABLE 2

|  | FIG. 14A linear corner route | | FIG. 14B elliptic curve route | | FIG. 14C random curve route | |
| --- | --- | --- | --- | --- | --- | --- |
|  | number | generating ratio | number | generating ratio | number | generating ratio |
| fixed rate | 665 | 100.00% | 351 | 100.00% | 554 | 100.00% |
| common techniques | 397 | 59.7% | 148 | 42.17% | 238 | 42.96% |
| present disclosure | 143 | 21.5% | 60 | 17.09% | 143 | 25.81% |

The first row represents the movement notification is periodically transmitted with a fixed transmission rate (for example, 10 Hz) regardless type of the road segment. That is, whether the road segment is straight or cursive does not affect the transmission rate. By transmitting the movement notification with the fixed transmission rate, 665 movement notifications are generated for the linear corner route in FIG. 14A, 351 movement notifications are generated for the elliptic curve route in FIG. 14B, and 554 movement notifications are generated for the random curve route in FIG. 14C.

Based on common techniques, the second row represents the transmission rate of movement notification is dynamically adjusted according the road condition. That is, for a relatively straight route, the transmission rate of movement notification is lower; and for a relatively cursive route, the transmission rate of movement notification is higher. Below, the three different routes are illustrated and compared for demonstration. For the linear corner route shown in FIG. 14A, 397 movement notifications are generated, and the generating ratio of movement notification is lowered to 59.7%. For the elliptic curve route shown in FIG. 14B, 148 movement notifications are generated, and the generating ratio of movement notification is lowered to 42.17%. For the random curve route shown in FIG. 14C, 238 movement notifications are generated, and the generating ratio of movement notification is lowered to 42.96%.

Based on the present disclosure, the third row represents the transmission rate of movement notification is dynamically determined according to difference between the estimated result and the detected result. For a relatively straight route, movement pattern of vehicles basically remain consistent that results in the estimated result and the detected result are highly likely to be matched. Consequentially, transmission rate of movement notification will be lower. On the other hand, for a relatively cursive route, movement pattern of vehicles may easily change, so that the estimated result and the practical detected result are barely matched. Consequentially, transmission rate of movement notification will be higher (for example, 10 Hz). For the linear corner route shown in FIG. 14A, only 143 movement notifications are generated and transmitted, and the generating ratio of movement notification can be lowered to 21.5%. For the elliptic curve route shown in FIG. 14B, only 60 movement notifications are generated and transmitted, and the generating ratio of movement notification can be lowered to 17.09%. For the random curve route shown in FIG. 14C, only 143 movement notifications are generated and transmitted, and the generating ratio of the movement notification can be lowered to 25.81%.

As compared above, for different routes, the number of movement notifications generated according to the present disclosure is much smaller than that generated according to the common techniques. Hence, the congest problem of communication bandwidth can be reduced.

When communication device A transmits actual position of vehicle A at time point (t0), a short period of transmission time (ΔT) is required for transmitting the movement parameter to communication device B. However, while the transmission time (ΔT) passes by, vehicle A may further move a short distance. Therefore, according to the common techniques, the position parameter of vehicle A detected and generated at time point (t0) is received by vehicle B at time point (t0+ΔT). In other words, the so-called actual position is actually out of date by the time being received by communication device B and a distance difference exists between the received detected position and the actual position of vehicle. Based on the present disclosure, distance difference may exist between the estimated position and the actual position of vehicle. Comparisons of distance difference based on the common techniques and the present disclosure are shown in Table 3.

accurate. While comparing with the estimated result of the common techniques, the estimated result according to the present disclosure is much closer to actual position of vehicle A.

As illustrated above, according to movement parameter received previously, the communication device, communication system and communication method according to the present disclosure are capable of estimating movement of other vehicles in a real time manner. If deviation of the estimated result is acceptable, the newly detected movement parameter is not necessary to be transmitted. Consequentially, rate of transmitting movement notification can be reduced. On the other hand, if the estimated result deviates significantly, the newly detected movement parameter must be transmitted and used for update. The proposed approach assures the quality of the movement parameter which is originated from the source device and transmitted between the source device and the destination device. Therefore, the communication device, communication system and communication method according to the present disclosure take into account both transportation efficiency (band width of the wireless communication network) and road safety (quality of the movement parameter).

Those skilled in the art would appreciate that various logic blocks, modules, circuits, and method steps in the above embodiments may be implemented by electronic hardware, computer software, and the combination there of. The connections in the implementation process, such as linking, coupling, electrical connection, or others are used to illustrate that when implementing the logic blocks, module, circuits, or method steps, different manners such as wired electronic signal, wireless electromagnet signal, and light signal can be used for direct or indirect transmission and switching of signal, data, or control information. Therefore, terms in the disclosure are not understood as limitation for implementing the connections. Other connections which are not described in the disclosure are also within the scope of the disclosure.

It will be apparent to those skilled in the art that various modifications and variations can be made to the disclosed embodiments. It is intended that the specification and

TABLE 3

| | FIG. 14A<br>linear corner route | | FIG. 14B<br>elliptic curve route | | FIG. 14C<br>random curve route | |
|---|---|---|---|---|---|---|
| | average distance difference (meter) | longest distance difference (meter) | average distance difference (meter) | longest distance difference (meter) | average distance difference (meter) | longest distance difference (meter) |
| common techniques | 0.29 | 1.00 | 0.31 | 1.00 | 0.30 | 1.00 |
| present disclosure | 0.19 | 0.99 | 0.18 | 0.98 | 0.15 | 0.99 |

According to Table 3, in either the case of the linear corner route (as shown in FIG. 14A), the elliptic curve route (as shown in FIG. 14B), or the random curve route (as shown in FIG. 14C), the average distance and the longest distance based on the present disclosure are respectively shorter than those based on the common techniques. Although the movement parameter transmitted by common techniques is actually measured, average/longest distance difference based on the common techniques is higher than those based on the present disclosure. The estimated result according to the present disclosure is comparatively more examples be considered as exemplary only, with a true scope of the disclosure being indicated by the following claims and their equivalents.

What is claimed is:

1. A communication method, applied between a first communication device and a second communication device, comprising:
    transmitting at least one first movement parameter, wherein a first moving device is equipped with the first communication device and the first communication device detects a movement of the first moving device at a first time point to obtain the at least one first movement parameter;

receiving and storing the at least one first movement parameter by the second communication device of a second moving device;

transmitting at least one second movement parameter to the second communication device selectively according to whether or not, a difference between an estimated internal movement parameter and the at least one second movement parameter is greater than a predefined threshold wherein the first communication device estimates a position of the first moving device at a second time point based on at least one estimating function and the at least one first movement parameter and accordingly obtains the estimated internal movement parameter, detects the movement of the first moving device at the second time point to obtain the at least one second movement parameter, and the second time point is later than the first time point; and obtaining the movement of the first moving device according to either the at least one second movement parameter or an estimated external movement parameter by the second communication device, wherein the second communication device estimates the position of the first moving device at the second time point based on the at least one estimating function and the at least one first movement parameter and accordingly obtains the estimated external movement parameter.

2. The communication method according to claim 1, wherein the estimated external movement parameter and the estimated internal movement parameter are consistent.

3. The communication method according to claim 1, wherein the at least one first movement parameter and the at least one second movement parameter are a combination of one or more of a longitude parameter, a latitude parameter, a velocity parameter, an acceleration parameter, a direction angle parameter, or a yaw rate parameter.

4. The communication method according to claim 1, wherein the step of transmitting the at least one second movement parameter to the second communication device selectively according to whether the difference between the estimated internal movement parameter and the at least one second movement parameter is greater than the predefined threshold further comprises steps of:

determining an updating condition as satisfied when the difference between the estimated internal movement parameter and the at least one second movement parameter is greater than the predefined threshold; and determining the updating condition as unsatisfied when the difference between the estimated internal movement parameter and the at least one second movement parameter is smaller than or equivalent to the predefined threshold.

5. The communication method according to claim 4, wherein the first communication device stores and transmits the at least one second movement parameter when the updating condition is satisfied.

6. The communication method according to claim 1, further comprising:

storing the at least one first movement parameter as at least one external movement parameter corresponding to the first communication device by the second communication device; and receiving the at least one second movement parameter and accordingly updating the at least one external movement parameter by the second communication device.

7. The communication method according to claim 1, wherein the first communication device transmits a setting selection of the at least one estimating function to the second communication device and the at least one estimating function is stored by the second communication device in advance, or the first communication device transmits the at least one estimating function to the second communication device.

8. The communication method according to claim 1, further comprising:

determining an effective interval by the first communication device, wherein the effective interval represents a duration that the at least one estimating function is effective;

transmitting the effective interval by the first communication device; and receiving the effective interval by the second communication device, wherein the second communication device stops using the at least one estimating function to estimate the position of the first moving device after the effective interval.

9. The communication method according to claim 1, further comprising:

synthesizing a first movement notification with the at least one first movement parameter by the first communication device, wherein the first movement notification represents the movement of the first moving device at the first time point; and transmitting the synthesized first movement notification by the first communication device.

10. The communication method according to claim 1, wherein the first communication device stores the first time point, and the step of transmitting the at least one second movement parameter to the second communication device selectively according to whether or not the difference between the estimated internal parameter and the at least one second movement parameter is greater than the predefined threshold further comprises steps of:

calculating the time difference between the second time point and the first time point;

transmitting the at least one second movement parameter to the second communication device by the first communication device when the time difference is greater than a transmission interval; and detecting the movement of the first moving device by the first communication device when the time difference is smaller than or equivalent to the transmission interval.

11. A communication system, comprising:

a first communication device, placed at a first moving device, configured to detect a movement of the first moving device at a first time point to obtain at least one first movement parameter, detect the movement of the first moving device at a second time point to obtain at least one second movement parameter, and transmit the at least one second movement parameter selectively according to whether or not a difference between an estimated internal movement parameter and the at least one second movement parameter is greater than a predefined threshold, wherein the first communication device estimates a position of the first moving device at the second time point based on the at least one estimating function and the at least one first movement parameter and accordingly obtains the estimated internal movement parameter, wherein the second time point is later than the first time point; and a second communication device of a second moving device, configured to receive and store the at least one first movement parameter, and obtain the movement of the first moving device at the second time point according to either the at least one second movement parameter or an estimated external movement parameter, wherein the second communication device estimates the position of the first moving device at the second time point based on at least one estimating function and the at least one first movement parameter and accordingly obtains the estimated external movement parameter.

12. The communication system according to claim 11, wherein the estimated external movement parameter and the estimated internal movement parameter are consistent.

13. The communication system according to claim 11, wherein the second communication device stores the at least one first movement parameter as at least one external movement parameter corresponding to the first communication device, receives the at least one second movement parameter, and accordingly updates the at least one external movement parameter.

14. The communication system according to claim 13, wherein when the difference between the estimated internal movement parameter and the at least one second movement parameter is greater than the predefined threshold, the first communication device synthesizes a second movement notification with the at least one second movement parameter and transmits the synthesized second movement notification, the second movement notification representing the movement of the first moving device at the second time point; and when the difference between the estimated internal movement parameter and the at least one second movement parameter is smaller than or equivalent to the predefined threshold, the first communication device transmits the second movement notification.

15. A communication device placed at a first moving device, comprising:

a movement detecting module, configured to detect a movement of the first moving device to obtain at least one first movement parameter at a first time point, and detect the movement of the first moving device to obtain at least one second movement parameter at a second time point, wherein the second time point is later than the first time point;

a transmitter, configured to transmit the at least one first movement parameter; and a controller, configured to estimate a position of the first moving device at the second time point based on at least one first estimating function and the at least one first movement parameter, and accordingly obtain an estimated internal movement parameter, wherein the controller controls the transmitter to transmit the at least one second movement parameter selectively according to whether or not a difference between the estimated internal movement parameter and the at least one second movement parameter is greater than a predefined threshold, wherein the transmitted at least one first movement parameter and the transmitted at least one second movement parameter are received by another communication device of a second moving device to estimate the position of the first moving device and obtain the movement of the first moving device at the second time point.

16. The communication device according to claim 15, wherein when the difference between the estimated internal movement parameter and the at least one second movement parameter is greater than a predefined threshold, the controller controls the transmitter to transmit the at least one second movement parameter; and when the difference between the estimated internal movement parameter and the at least one second movement parameter is smaller than or equivalent to the predefined threshold, the controller controls the transmitter not to transmit the at least one second movement parameter.

17. The communication device according to claim 15, further comprising:

a storage device, configures to store the at least one first movement parameter, wherein the storage device further stores the at least one second movement parameter when the controller controls the transmitter to transmit the at least one second movement parameter.

18. The communication device according to claim 15, further comprising a receiver, configures to receive at least one third movement parameter corresponding to the second moving device, wherein the controller estimates a position of the second moving device based on at least one second estimating function and the at least one third movement parameter.

19. The communication device according to claim 18, wherein the communication device receives a setting selection of the at least one second estimating function and the at least one second estimating function is stored in the communication device in advance or the communication device receives the at least one second estimating function.

* * * * *